United States Patent [19]

Ooshima et al.

[11] Patent Number: 5,248,236

[45] Date of Patent: Sep. 28, 1993

[54] TRANSFER SYSTEM AND TRANSFER PALLET

[75] Inventors: Tadayoshi Ooshima; Haretaro Hidaka, both of Hiroshima; Yoshihiro Tsuchimoto, Tokyo; Naoya Shimizu, Chiba, all of Japan

[73] Assignees: Mitsubishi Jukogyo Kabushiki Kaisha; Asahi Glass Company Ltd., both of Tokyo, Japan

[21] Appl. No.: 738,908

[22] Filed: Aug. 1, 1991

[30] Foreign Application Priority Data

| Aug. 8, 1990 | [JP] | Japan | 2-208138 |
| Aug. 8, 1990 | [JP] | Japan | 2-208139 |
| Aug. 8, 1990 | [JP] | Japan | 2-208140 |
| Aug. 8, 1990 | [JP] | Japan | 2-208141 |
| Jul. 16, 1991 | [JP] | Japan | 3-175256 |

[51] Int. Cl.$^5$ ............................................. B65G 35/00
[52] U.S. Cl. .................................... 414/676; 104/292; 198/619
[58] Field of Search ............... 198/619, 955; 414/676; 104/23.2, 292

[56] References Cited

U.S. PATENT DOCUMENTS

| 3,610,695 | 10/1971 | Yabuta . |
| 3,889,602 | 6/1975 | Barber . |
| 4,444,541 | 4/1984 | Bergman | 414/676 |
| 4,714,155 | 12/1987 | Watanabe et al. | 198/619 |
| 4,718,539 | 1/1988 | Fukuwatari et al. | 198/619 |

FOREIGN PATENT DOCUMENTS

| 2717035 | 10/1978 | Fed. Rep. of Germany . |
| 57-48520 | 3/1982 | Japan | 198/619 |
| 59-31208 | 2/1984 | Japan | 198/619 |
| 160972 | 7/1987 | Japan | 414/676 |
| 1297727 | 11/1972 | United Kingdom . |

Primary Examiner—Michael S. Huppert
Assistant Examiner—Janice Krizek
Attorney, Agent, or Firm—Wenderoth, Lind & Ponack

[57] ABSTRACT

A transfer system includes an air table, and a linear motor cooperating with the air table to float and move a pallet. The transfer system is designed to allow for a small radius of curvature for each turning section of the air table. Ball valves of the air table are openable upon contact with a pallet to apply air under pressure to a pallet. A linear motor is adapted to move the floating pallet, and guides are provided to guide the moving floating pallet. The pallet includes a pallet body made of a light material, and an external load part made of metal. The external load part has a lower surface projecting slightly from the lower surface of the pallet body. Guides are mounted to the outer periphery of the pallet body. A linear motor secondary conductor is mounted to the lower surface of the pallet body.

11 Claims, 28 Drawing Sheets

TRANSFER SYSTEM AND TRANSFER PALLET

BACKGROUND OF THE INVENTION

1. Field of the Invention

The present invention relates to a transfer system for transferring a load such as a heavy object to be processed, and a transfer pallet on which the load is placed.

2. Description of the Related Art

FIGS. 27 to 31 show transfer systems known in the art.

Referring first to FIGS. 27 to 29, a conventional transfer system includes a truck 1. A table 2 is connected to a truck body 3 by a vertical support 2'. Wheels 6 are rotatable about a horizontal shaft which is mounted to the truck body 3. Reference numeral 4 designates a guide having a U-shaped cross section. A pair of rails 5 are fixed to the inner walls of the guide 4. The wheels 6 of the truck 1 are supported on the rails 5. Wheels 7 are each rotatable about a vertical shaft which is connected to the truck body 3. The wheels 7 are in contact with the inner side walls of the guide 4. Reference numeral 8 designates a secondary conductor of a linear motor. Primary coils 9 of the linear motor are fixedly mounted on the bottom of the guide 4 and are spaced apart from one another in the direction in which the truck is advanced. Reference numerals 10 designate stations. A turning section 11 of the guide 4 changes the direction of advancement of the truck. With this arrangement, the wheels 6 are placed on the rails 5, and the wheels 7 are brought into contact with the side walls of the guide 4. A load (a heavy object to be processed) is placed on the table 2. The truck 1 is moved from one station 10 to another station 10 along the guide 4 when the linear motor primary coils 9 are energized.

FIGS. 30 and 31 show another transfer system known in the art. Reference numeral 14 designates 14 a base. In air duct 15 is seated on the base 14. Reference numeral 12 designates a top plate of the air duct 15. A number of nozzle holes 13 are formed in the entire surface of the top plate 12. Linear motor primary coils 16 are mounted within the air duct 15. Reference numeral 17 designates a pallet including a linear motor secondary conductor on its lower surface. Reference numeral 18 designates a pressurized air supply source. The base 14 and the air duct together form an air table. Air under pressure is supplied from the pressurized air supply source to the air duct 15 and is then injected from the nozzles 13 to float the pallet 17 together with a load above the top plate 12 of the air duct 15. The pallet 17 together with the load is transferred from one station to another station when the linear motor primary coils 16 are energized.

Conventionally, a transfer system employs a pallet to carry a light load of several kilograms to several hundred kilograms. The pallet together with the light load is floated on an air table and moved by a linear motor as shown, for example, in FIGS. 30 and 31.

In the prior art transfer system shown in FIGS. 27 to 29, the table 2 is attached to the truck 1 by a single post or support 2'. This causes the table 2 to swing and move out of alignment with the guide 4. Thus, a load on the table can not be moved in parallel to the guide 4.

Also, if the section 11 of the guide 4 has a small radius of curvature, a pair of front wheels 6, the four wheels 7 and a pair of rear wheels are oriented as shown in FIG. 28. This inhibits a change in the direction of movement of the truck 1. To this end, the guide 4 is constructed in a factory so that the section 11 has a large radius of curvature. This detracts from the flexibility of the transfer system. In addition, the truck 1 can not be stopped in a predetermined position. This detracts from the operability and safety in a production line.

In the prior art transfer system shown in FIGS. 30 and 31, a large pressurized air supply source is required to inject air under pressure from a number of nozzle holes 13 of the air duct (or air table) not only before each pallet 17 passes, but also after the pallet has passed. This results in an increase not only in the cost of the system, but also in the consumption of the pressurized air and thus in the operating cost of the system.

In the prior art transfer system incorporating the air table and the linear motor, a pallet must be rigid and heavy to transfer a heavy load, for example, of several tons (about two tons) at a high speed (2 meters/sec). To transfer such a heavy pallet at a high speed it is necessary to employ a large linear motor and to effect a high flow rate of pressurized air. However, this leads to the necessity of using a large transfer system.

In order to improve production efficiency, a pallet is transferred to a press machine in a production or press line while being floated by air under pressure. A force is then applied to press a load on the pallet. The pallet must be rigid to accommodate this force. This leads to the necessity of employing a heavy pallet. To transfer such a heavy pallet, it is necessary to provide a large linear motor and to effect a high flow rate of air under pressure. This results in the necessity of employing a large press system.

SUMMARY OF THE INVENTION

In view of the foregoing, it is an object of the present invention to provide a transfer system which enables accurate movement of a pallet with a load on an air table, which can systematically be arranged, and which has low equipment and running costs.

Another object of the present invention is to provide a pallet which is lightweight and which can be transferred by a small linear motor and low flow rate of air under pressure, whereby the overall size of the transfer system designed to float the pallet above the air table and move the pallet is comparatively small.

(1) According to the present invention, there is provided a transfer system comprising an air table, and ball valves assembled in the air table. The ball valves, when contacted with a pallet, are opened to apply air under pressure to float the pallet. A linear motor is mounted to the air table and is adapted to move the floating pallet. A guide is mounted to the air table and is adapted to guide the floating pallet.

(2) According to the present invention, in a transfer system wherein an air table and a linear motor cooperate to float and move a pallet and a load placed on the pallet, the transfer system further includes a device for changing the direction of conveyance of the pallet comprising acceleration primary coils and deceleration primary coils of the linear motor mounted to turning sections of the air table, pallet stoppers mounted to outer turning sections in a face-to-face relation to the pallet as conveyed, and guides mounted to the turning sections to guide the pallet and including recesses through which guide rollers of the pallet pass.

(3) According to the present invention, there is provided a transfer system comprising an air table, and a linear motor cooperating with the air table to float and move a pallet and a load placed on the pallet, the transfer system further including a guide attached on the outer periphery of the pallet, guides mounted to the air table and adapted to engage the guide, pallet stoppers mounted to outer turning sections of the air table in a face-to-face relation to the pallet as conveyed, and retractable pallet stoppers mounted to intermediate sections, rather than the turning sections, of the air table.

(4) According to the present invention, there is provided a transfer pallet floatable by air under pressure and movable by a linear motor, comprising a pallet body made from a light material, and an external load part made of metal. The external load part has a lower surface projecting slightly from the lower surface of the pallet body. The pallet body includes a plurality of guides on its outer periphery and a secondary conductor of the linear motor on its lower surface.

In the transfer system (1) of the present invention, the pallet is placed on the air table, and a load is placed on the pallet. The ball valve, located immediately below the pallet, is opened to apply air under pressure to the pallet. The primary coils are then energized to accelerate the floating pallet. The pallet is moved to a station while being guided by the guide. When the pallet reaches the station, the primary coils are energized to reduce the speed of the pallet, and the pallet stoppers are operated to stop the pallet. The pallet is thereafter moved to a next station after the work at the present station has been completed.

In the device (2) for changing the direction of conveyance of a pallet, the pallet is placed on the air table, and a load is placed on the pallet. Air under pressure is applied through the ball valves to the pallet. The acceleration primary coils are then energized to accelerate the floating pallet. The guide rollers and the grooved guide cooperate to guide the pallet. When the pallet reaches the turning section of the air table, the deceleration primary coils are energized to reduce the speed of the pallet. The pallet stoppers are then operated to stop the pallet. A guide roller mounted to an inner front part of the pallet is moved into the grooved guide through a recess. Thereafter, the acceleration primary coils mounted to the turning section of the air table are energized to accelerate the pallet. At this time, a guide roller mounted at an inner rear part of the pallet is moved out of the grooved guide through a recess. When the pallet reaches a next station, the direction of conveyance of the pallet is changed in a similar manner.

In the transfer system (3) of the present invention, the pallet is placed on the air table, and a load is also placed on the pallet. Air under pressure is applied from the ball valves to the pallet. The acceleration primary coils are then energized to accelerate the floating pallet. The pallet is then moved to a certain station while the guide of the pallet is guided by the guides of the air table. When the pallet reaches the station, the deceleration primary coils are energized to reduce the speed of the pallet. The pallet stoppers are then operated to stop the pallet. After the load has been processed, the pallet is moved to the next or turning section of the air table in the foregoing manner. The pallet is again brought into contact with the pallet stopper and is stopped.

In the transfer pallet (4) of the present invention, the pallet is placed on the air table, and a load is also placed on the external load part of the pallet. The pallet together with the load is then lifted by air under pressure. The linear motor and the guides cooperate to move the pallet to a predetermined station. When the pallet reaches the station, application of the air under pressure is prevented. This causes the pallet to be placed on the air table. The lower surface of the external load part projects slightly from the lower surface of the pallet body. Thus, the pallet body made from a light material in no way contacts the air table. Instead, the external load part made of iron or other metals is brought into contact with the air table to support the load. As a result, no external force (for example, pressing force) is applied to the pallet body.

BRIEF DESCRIPTION OF THE DRAWINGS

For a better understanding of the present invention, reference may be made to the following description of preferred embodiments when taken in conjunction with the accompanying drawings, in which.

DETAILED DESCRIPTION OF THE PREFERRED EMBODIMENTS

Figure 1:
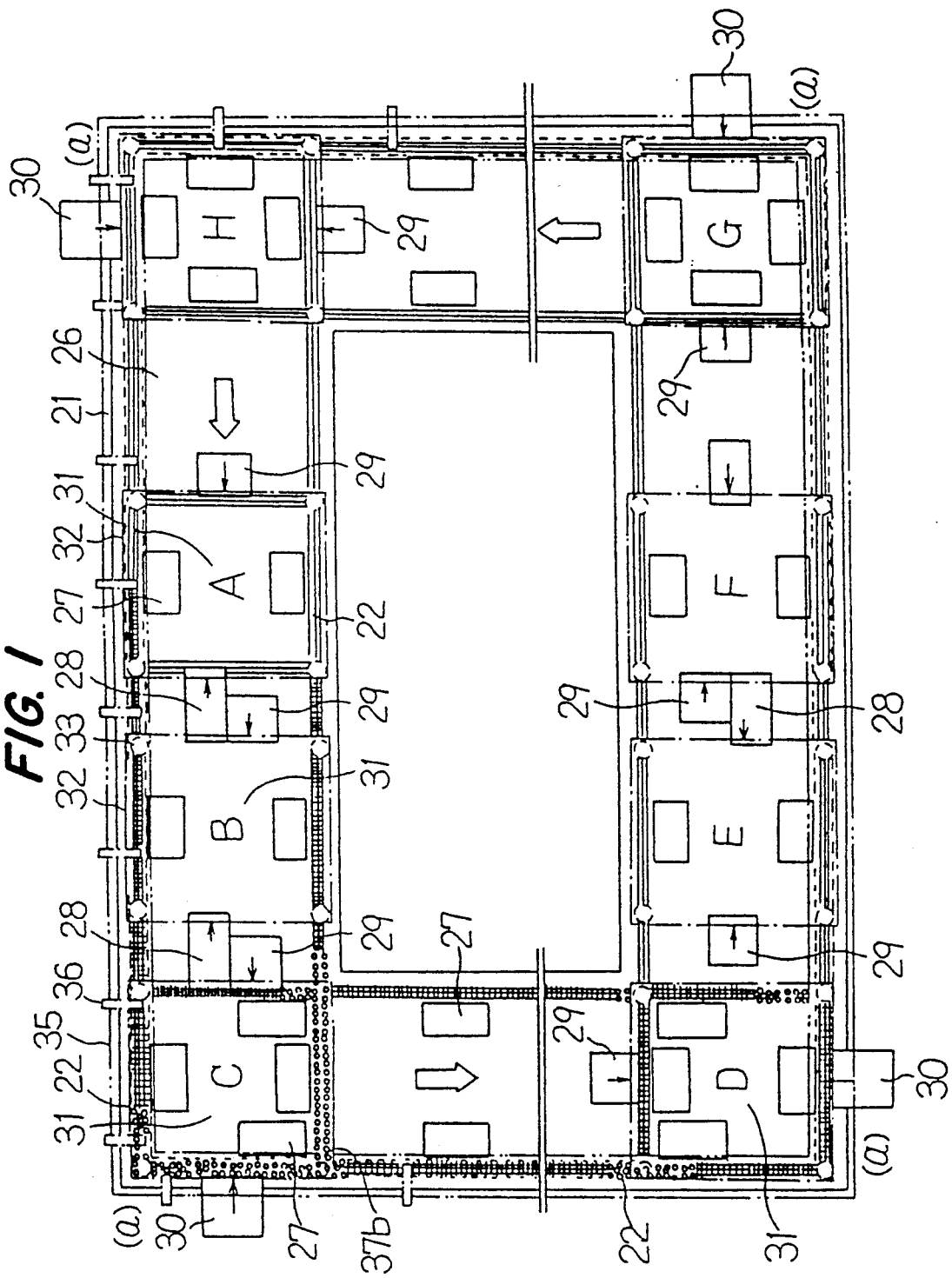
FIG. 1 is a plan view of a first embodiment of a transfer system according to the present invention.
Figure 2:
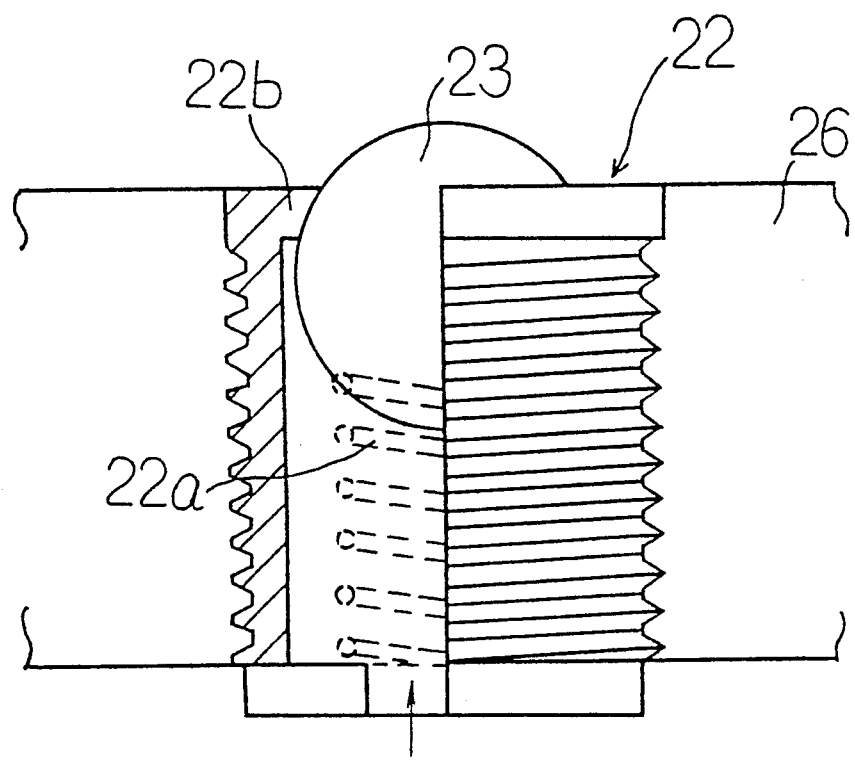
FIG. 2 is a partial sectional view of a ball valve.
Figure 3:
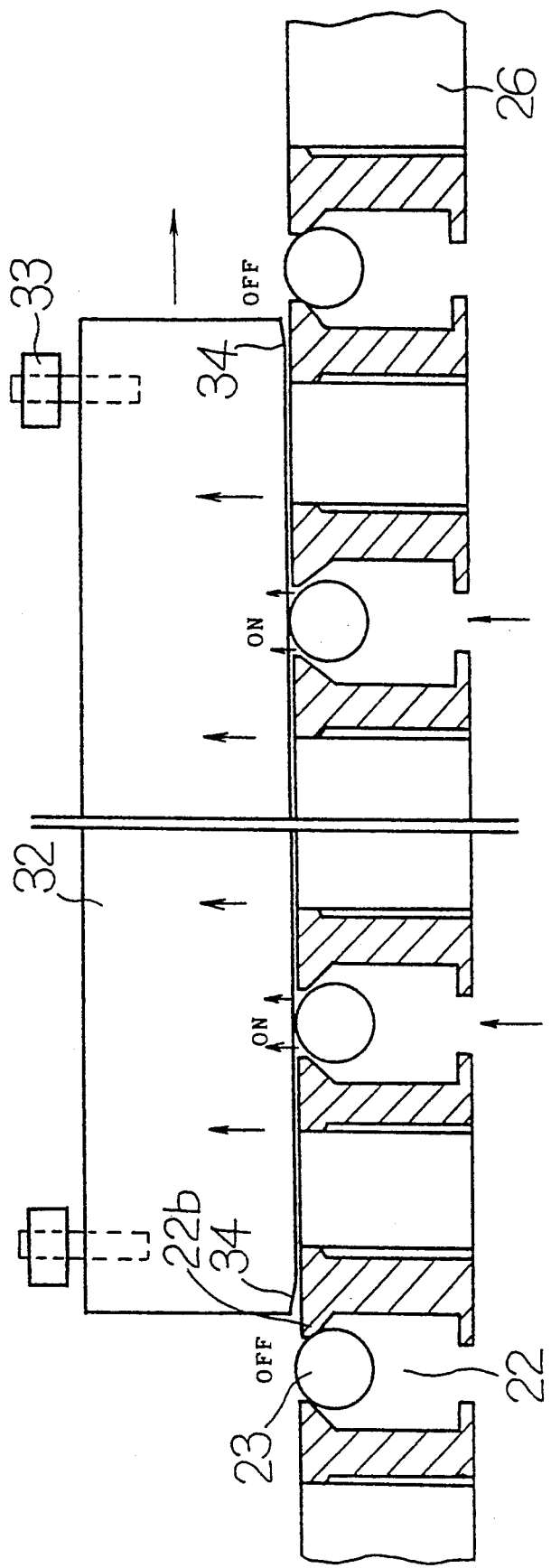
FIG. 3 is a sectional view of a portion of the transfer system in which the ball valves are assembled.
Figure 4:
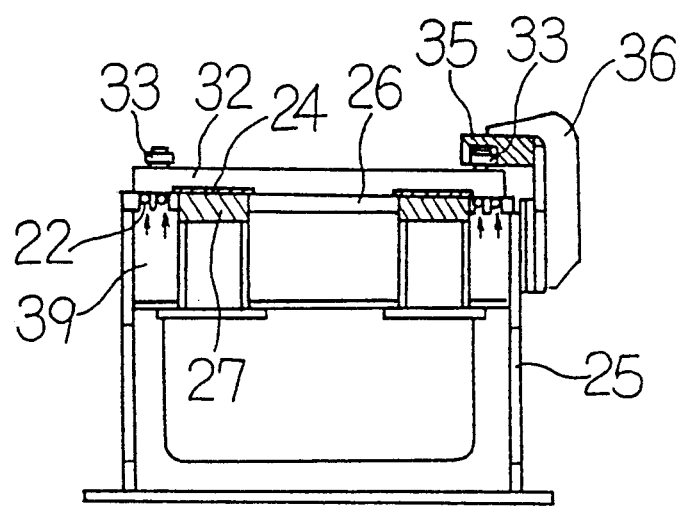
FIG. 4 is a front view, partially in section, of a guide.
Figure 5:
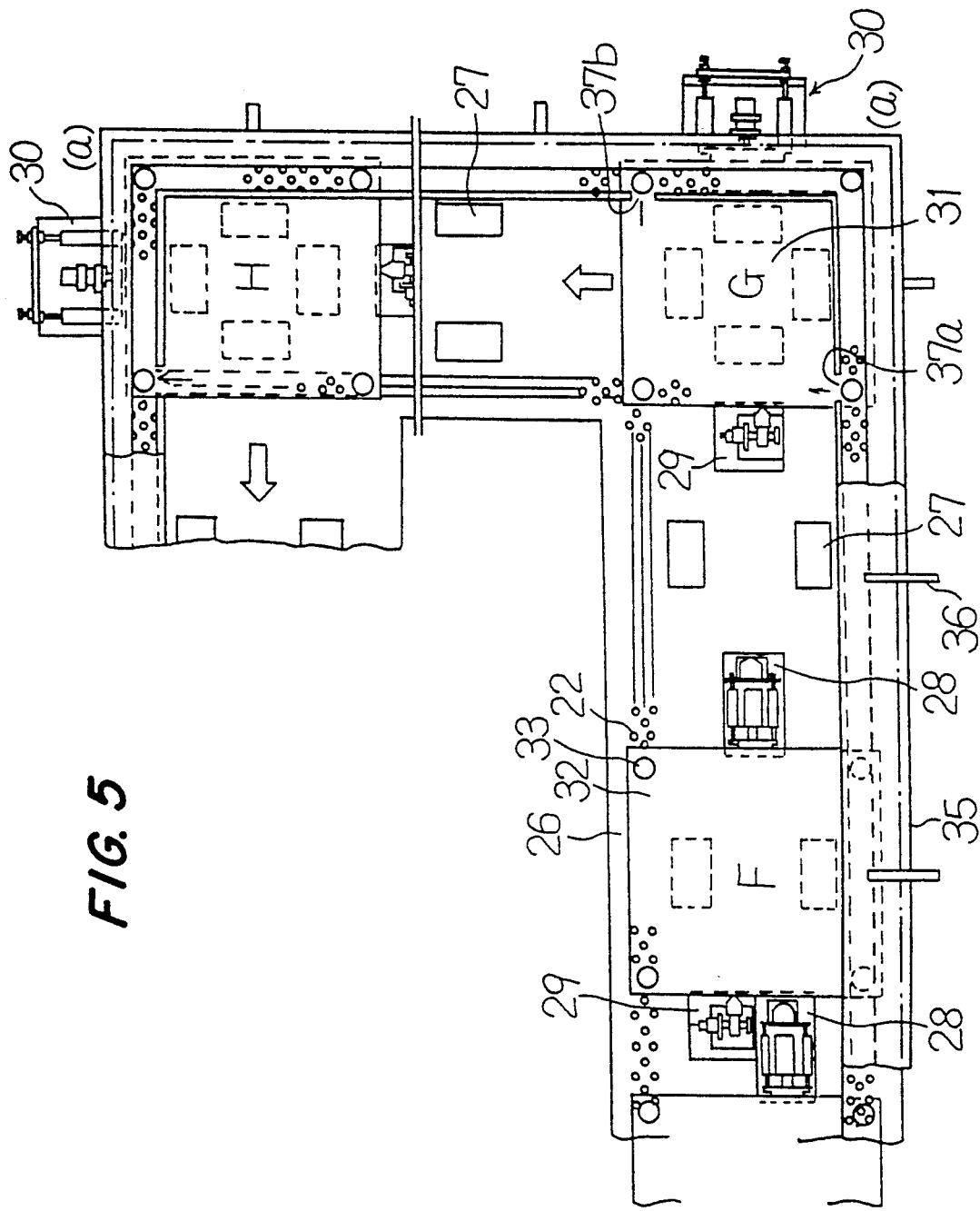
FIG. 5 is a plan view of pallet stoppers.
Figure 6:
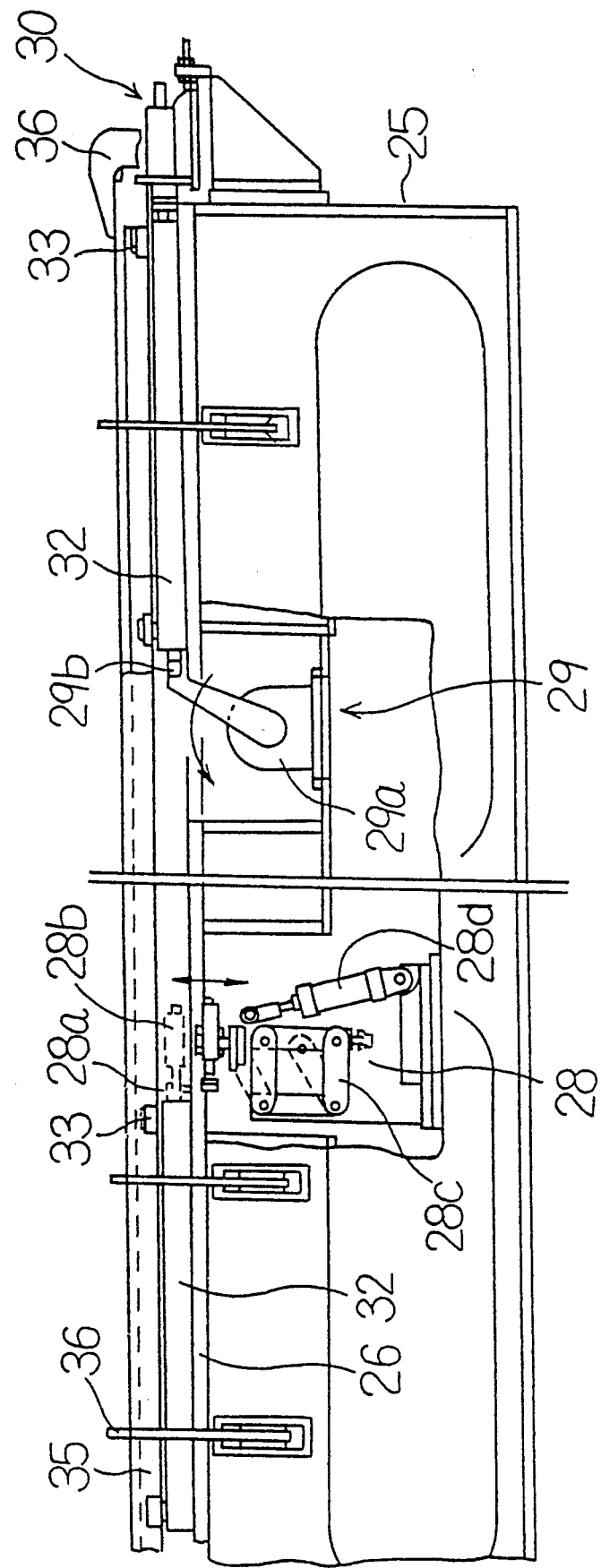
FIG. 6 is a side view of the pallet stoppers.
Figure 7:
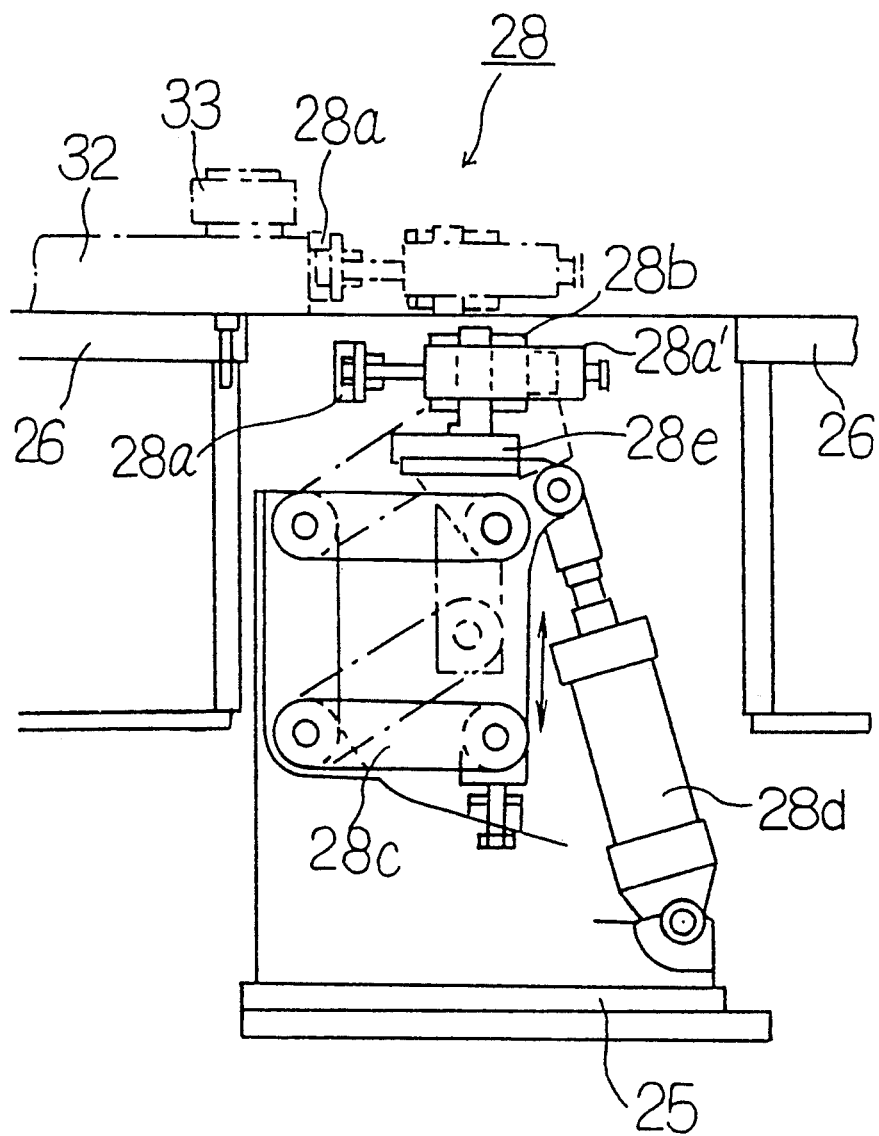
FIG. 7 is a side view of the pallet stopper arranged in the intermediate section of an air table.
Figure 8:
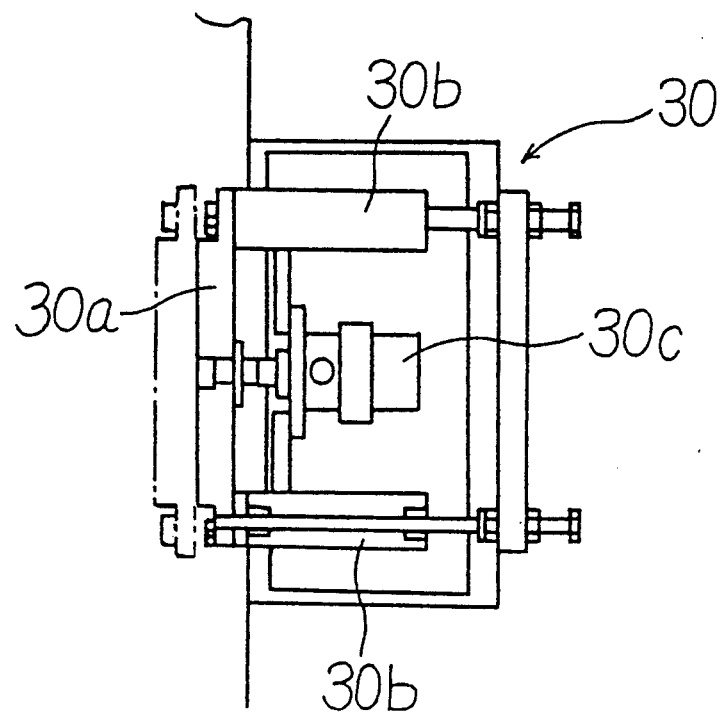
FIG. 8 is a plan view of the pallet stopper arranged in the 90° corner or turning sections of the air table.
Figure 9:
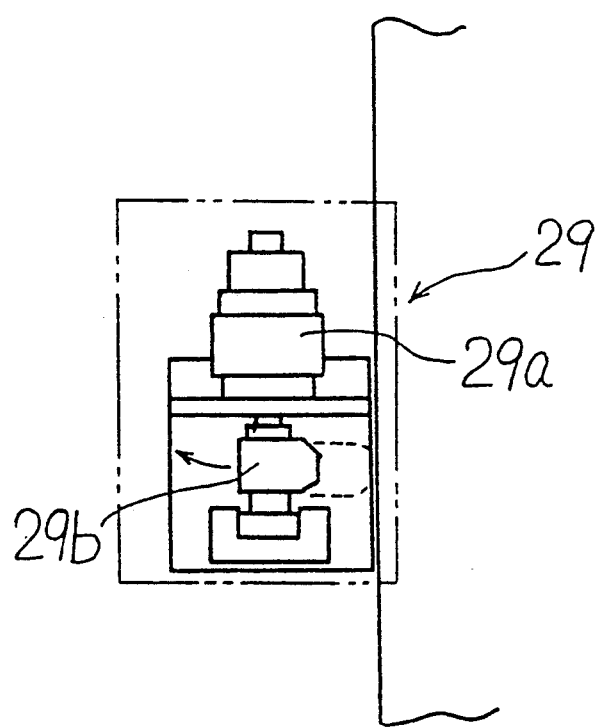
FIG. 9 is a plan view of the pallet stopper arranged in the intermediate section of the air table.

FIGS. 1 to 9 illustrate a first embodiment of the present invention. Referring to FIGS. 1 to 6, reference numeral 26 designates an air table or frame of a rectangular shape as viewed in plan. A number of ball valves 22 are formed in the air table 26. Referring to FIGS. 2 and 3, each ball valve 22 includes a ball 23. A spring 22a urges the ball 23 toward a valve seat 22b to close the ball valve. In FIGS. 1, 3, 4 and 5, reference numeral 32 designates a pallet. Referring to FIG. 4, linear motor secondary conductors 24 are attached to the lower surface of the pallet 32. Reference numeral 25 designates a base of the air table 26. In FIGS. 1 and 4, (a) denotes outer sections of the air table 26 which face the pallet in the direction in which the pallet is conveyed. Linear motor primary coils 27 are mounted to the air table 26. In FIGS. 4 and 5, a grooved guide 35 is provided on the outer periphery of the air table 26. A mounting plate 36 fixes the grooved guide 35 to the base 25. A guide roller 33 is mounted to each corner of the pallet 32 and rotates within the grooved guide 35. In FIGS. 1, 6 and 8, pallet stoppers 30 are each provided at the front side of the 90° turning section of the air table 26 in the direction of conveyance of the pallet. Each pallet stopper 30 comprises a stopper plate 30a, guides 30b adapted to support retractable guide rods integral with the stopper plate 30a, and a shock absorber 30c disposed between the guides 30b and the stopper plate 30a. The pallet stoppers 30 are mounted to the base 25. In FIGS. 1 and 5 to 7, pallet stoppers 28 are centrally located in the air table 26. Each pallet stopper 28 comprises a retractable stopper plate 28a, guides 28a' adapted to support the stopper plate 28a, a shock absorber 28b disposed between the stopper plate 28a and the guides 28a', a support table 28e adapted to support the guides 28a', a link mechanism 28c adapted to vertically move the support table 28e, and a drive cylinder 28d connected between the link mechanism 28c and the base 25. In FIGS. 1, 5, 6 and 9, pallet stoppers 29 cooperate with the pallet stoppers 30 and 28 so as to stop the pallet 32 in the 90° turning sections and the intermediate sections of the air table 26. Each pallet stopper 29 comprises an air motor 29a, and a wedge-shaped stopper arm 29b. When the pallet 32 comes into contact with the Pallet stoppers 30 and 28, the air motor 29a is energized to swing the wedge-shaped stopper arm 29b in the direction of the arrow shown in FIG. 9. This causes the wedge-shaped stopper plate to come into contact with the rear surface of the pallet 32 and cooperate with the pallet stoppers 30 and 28 to stop the pallet in the 90° turning sections and the intermediate sections of the air table.

As shown in FIGS. 1 and 5, the air table has stations 31 provided at the four turning sections as indicated by C, D, G and H, and the intermediate sections as indicated by A, B, E and F. The pallet stoppers 30 and 29 are located at the front and rear sides (or upstream and downstream sides in the direction of conveyance of the pallet) of each of the turning sections C, D, G and H of the air table 26. Also, the pallet stoppers 28 and 29 are located at the front and rear sides of each of the intermediate sections A, B, E and F of the air table 26.

Air at high pressure is fed to each ball valve 22 from its bottom by a source of air (not shown). As shown in FIG. 3, the ball 22 is brought into contact with the bottom of the pallet 32 against the action of the spring 22a and air. Air under pressure introduced into the interior of each ball valve as shown by the arrow in FIG. 3 tends to cause the ball 22 to close the valve. A mechanism may be incorporated to prevent the ball 22 from moving down within the valve. This eliminates the need for the springs 22a.

Each pair of linear motor primary coils 27 is mounted on the air table 26 and the coil are located at opposite sides of each of the stations A to H in the direction in which the pallet is conveyed.

As shown in FIG. 5, a pair of notches 37a and 37b are formed in the inner side of the grooved guide 35 at the 90° turning section to allow the guide rollers 33 to pass.

The operation of the transfer system according to the first embodiment shown in FIGS. 1 to 9 is as follows. The pallet 32 is placed on, for example, the station H. A load is then loaded on the pallet 32. The pallet 32 is pushed down against the action of the spring 22a. Air under pressure is supplied to float the pallet 32 together with the load. The linear motor primary coils 27 are energized to move the pallet toward the station A while guide rollers 33 of the pallet 32 are rotated within the grooved guide 35 of the air table 26.

When the pallet 32 together with the load has reached the station A of the air table 26, the speed of the pallet 32 is decreased by the linear motor primary coils 27. The pallet 32 is then brought into contact with the pallet stopper 28 and pushed toward the pallet stopper 28 by the pallet stopper 29. After the pallet 32 is stopped, the pallet stoppers 28 and 29 are moved down to their original positions. The pallet 32 together with the load is then moved toward the station B. The pallet 32 is stopped in a similar manner. The pallet 32 is next moved toward the station C, or 90 ° turning section of the air table, until it comes into contact with the pallet stopper 30. The pallet stopper 29 is then operable to push the pallet 32 from its back. This results in stoppage of the pallet 32. The pallet 32 is repeatedly moved and stopped in a similar manner when it passes the stations D to H.

When the pallet 32 passes the stations or turning sections of the air table H, C, D and G, the guide rollers 33 are moved through the notches 37a and 37b to allow the pallet 32 to change its direction.

Figure 10:
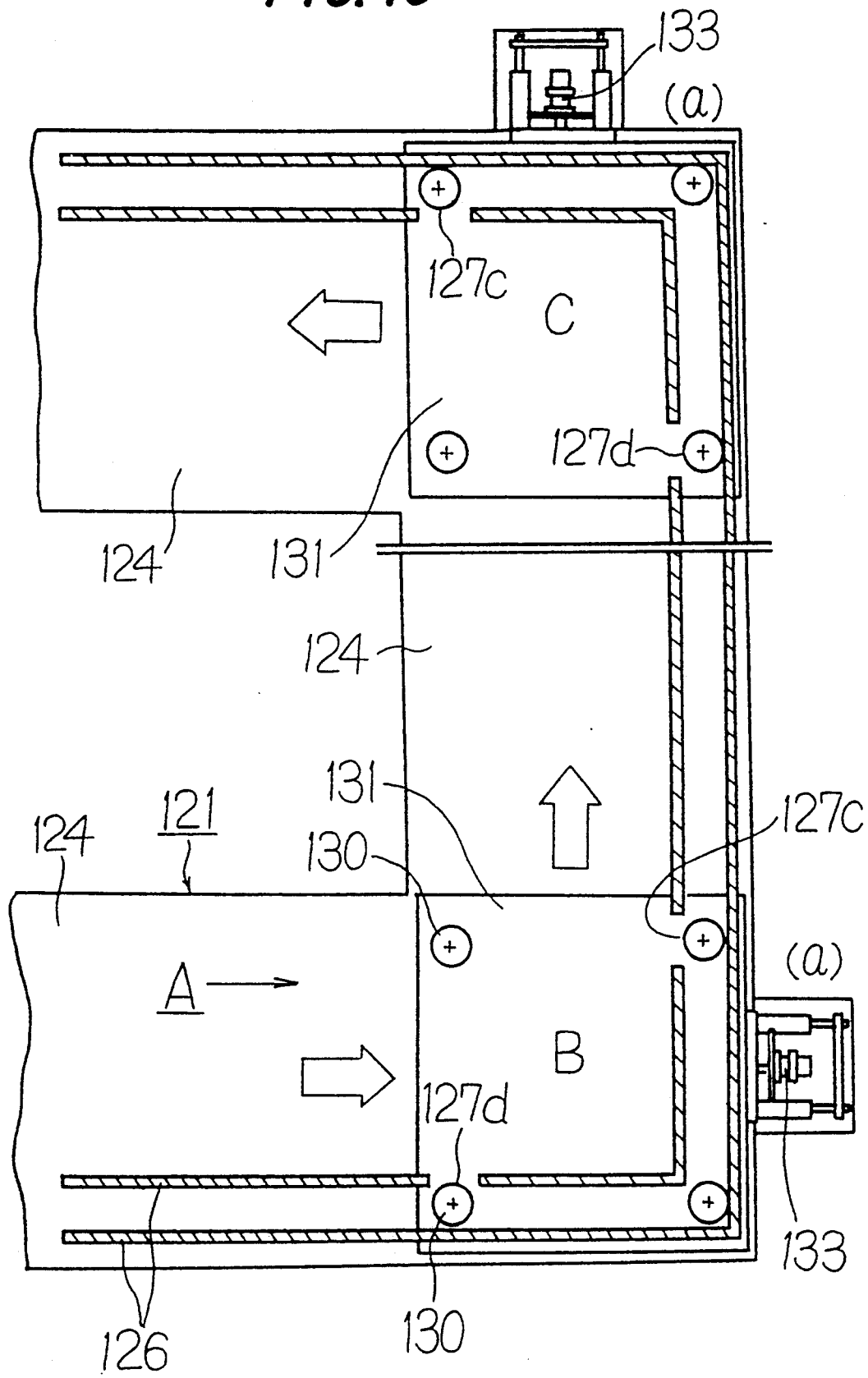
FIG. 10 is a plan view of a grooved guide of a second embodiment of a transfer system according to the present invention.
Figure 11:
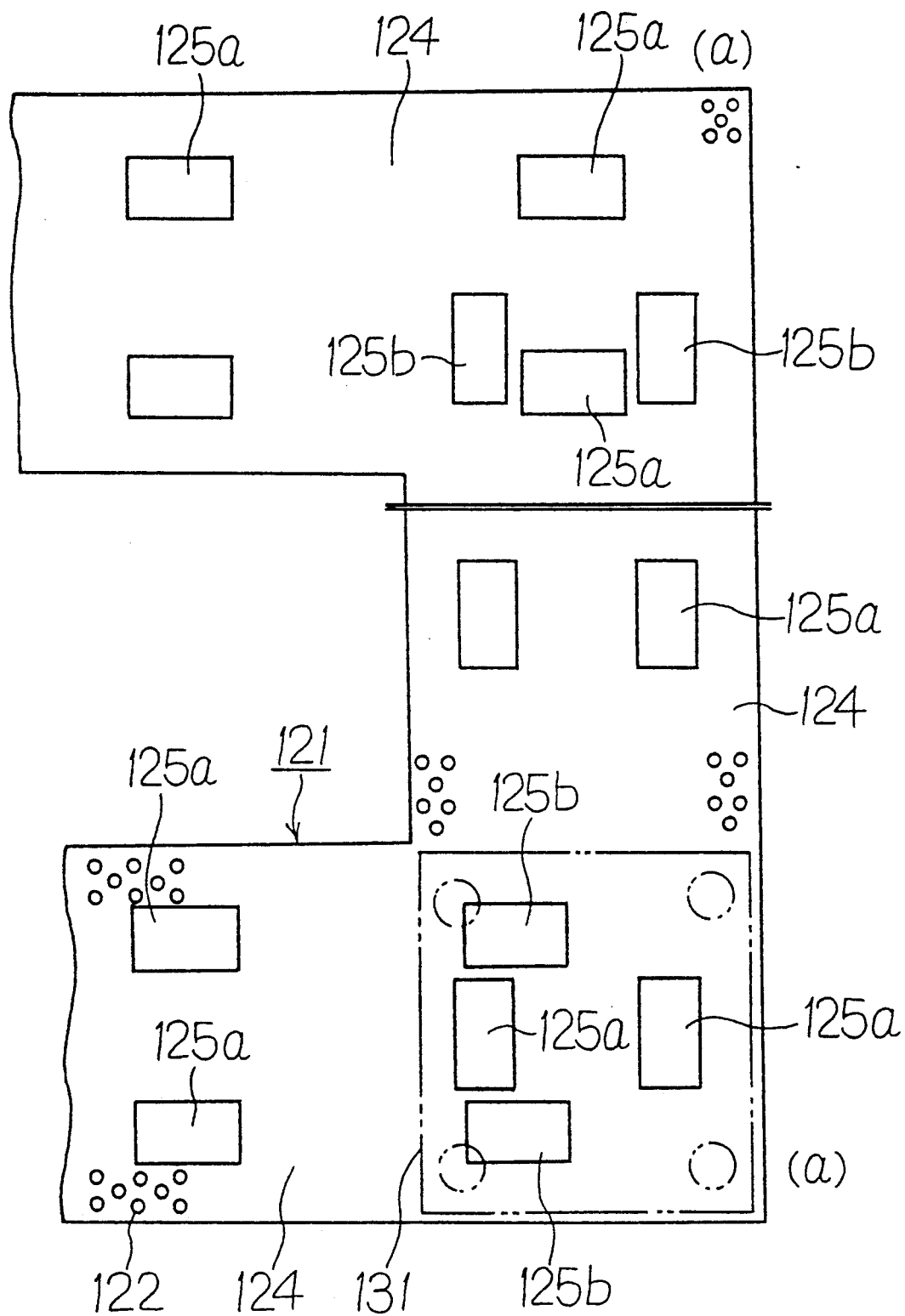
FIG. 11 is a schematic plan view of the layout of acceleration primary coils and deceleration primary coils of a linear motor.
Figure 12:
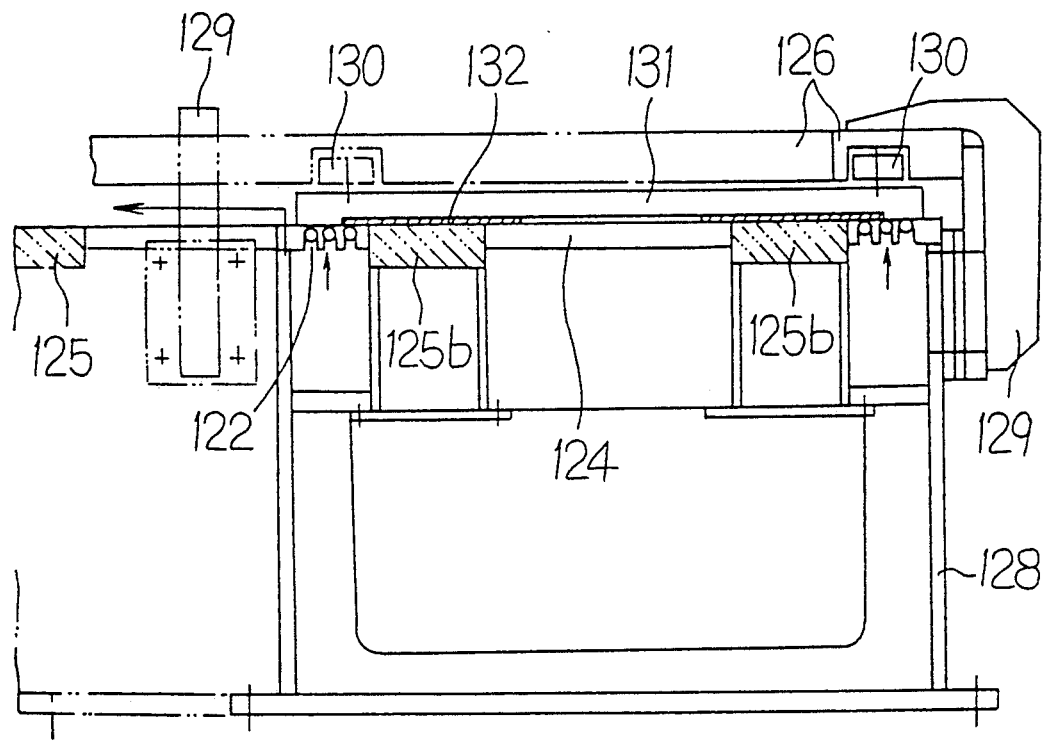
FIG. 12 is a side view, partially in section, of an air table employed in the second embodiment.
Figure 13:
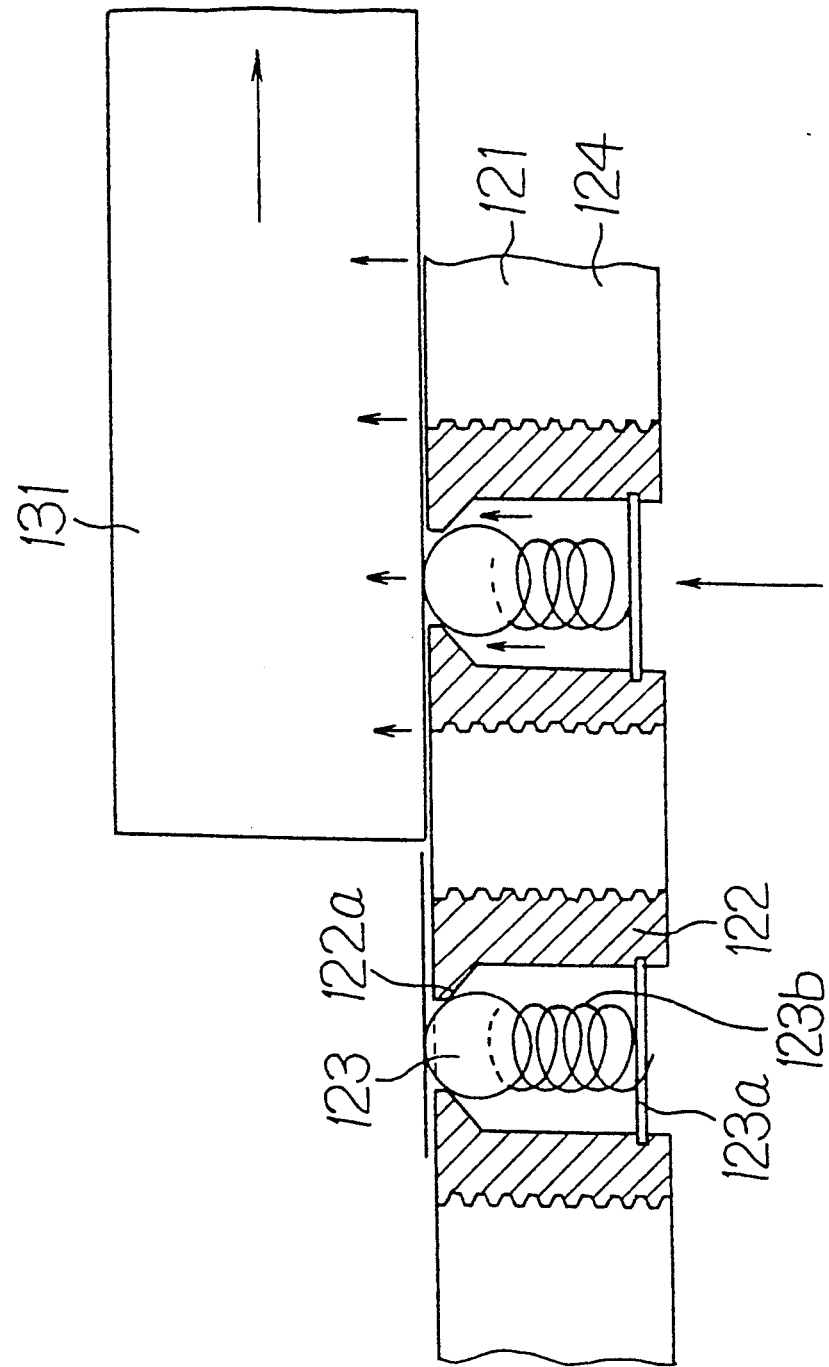
FIG. 13 is an enlarged view, partially in section, of the air table.

A transfer system according to a second embodiment of the present invention will now be described with reference to FIGS. 10 to 13. In FIGS. 10 to 13, reference numeral 21 designates a transfer system. In FIGS. 12 and 13, reference numeral 124 designates a rectangular air frame or table. Pressurized air ball valves 122 are assembled in the air table 124. A ball 23 is located within each ball valve 122. A spring seat 123a is mounted within each ball valve 122. A spring 123b is disposed between the spring seat 123a and the ball 123 and is adapted to normally urge the ball 123 against a valve seat 122a so as to close the ball valve 122. Air under pressure is introduced into the interior of the ball valve 122 to push the ball 123 against the valve seat 122a. A mechanism may be incorporated to prevent the ball 123 from falling down from the valve seat 122a. This eliminates the need for the spring 123b.

The air table 124 is mounted on a base 128. In FIGS. 10 and 11, (a) denotes a 90° turning section provided at each corner of the air table 124. In FIG. 11, reference numerals 125b designate deceleration linear motor primary coils of a type known in the art. Each pair of acceleration primary coils 125 is mounted to the air table 124 with the coils thereof being in a spaced relation. Each pair of deceleration primary coils 125b is mounted to the turning section of the air table 124 with the coils thereof being in a spaced relation. In each turning section, the longitudinal axis of each acceleration primary coil 125a extends at right angles to the longitudinal axis of each deceleration primary coil 125b.

In FIGS. 10 and 12, a grooved guide 126 is provided on the outer peripheral edge of the air table 124. Reference numeral 129 designates a mounting plate by which the grooved guide 126 is secured to the base 128. Reference numeral 131 designates a transfer pallet, 132 a linear motor secondary conductor mounted to the lower surface of the pallet 131, and 130 are four guide rollers mounted on each corner of the pallet 131 and adapted to rotate within the grooved guide 126.

Notches 127c and 127d are formed in the grooved guide 126 to allow the guide rollers to pass therethrough. These notches are formed in the inner turning section of the air table.

In FIG. 10, reference numerals 133 designate pallet stoppers which are similar in structure to the pallet stoppers 30 of the first embodiment. The pallet stoppers 133 are mounted to the grooved guide 126.

In operation, the pallet 131 is placed on the air table 124, and a load is loaded on the pallet 131. The ball 123 of the ball valve 122 is then pushed down against the action of the spring 134. Air under pressure is applied to the pallet 131. This causes the pallet 131 together with the load to float.

The linear motor primary coils 125a are operable to move the pallet 131 in the direction of the arrow A shown in FIG. 10. At this time, the guide rollers 130 are rotated within the grooved guide 126 so as to guide the pallet in that direction. When the pallet 131 reaches the turning section of the air table 124, the deceleration primary coils 125b are operable to reduce the speed of the pallet 131. The pallet 131 is stopped when it comes into contact with the pallet stopper 133. At this time, the guide roller, located at the inner front of the pallet 131, is moved into the grooved guide 126 through the notch 127c.

The acceleration primary coils 125a are then operable to accelerate the pallet 131. The pallet 131 is moved toward the next turning section of the air table 124. At this time, the guide roller, located at the inner rear of the pallet 131, is moved out of the grooved guide 126 through the notch 27d. When the pallet 131 reaches the next turning section, the pallet is turned by 90° in a similar manner.

Figure 14:
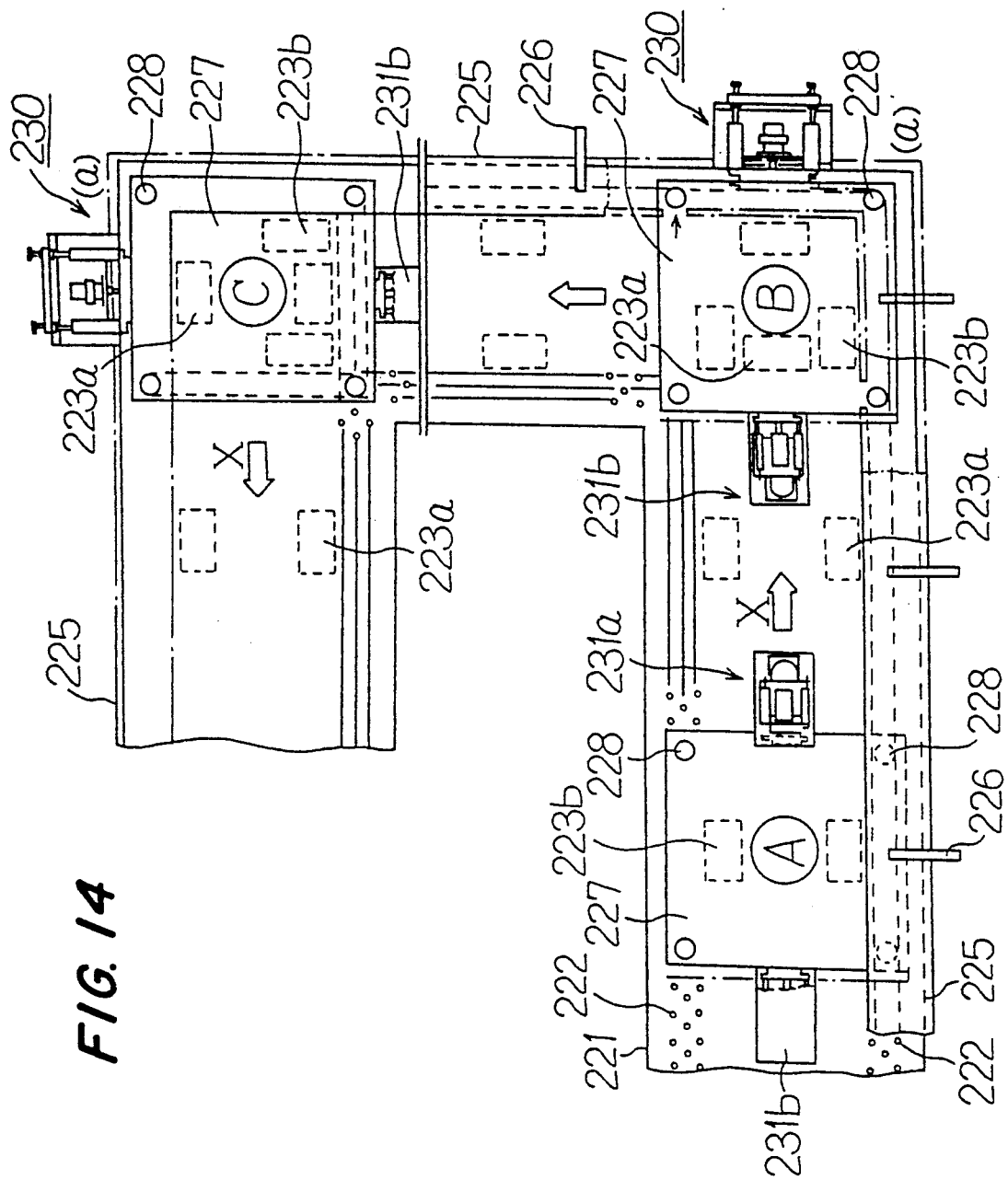
FIG. 14 is a plan view of a third embodiment of a transfer system according to of the present invention.
Figure 17:
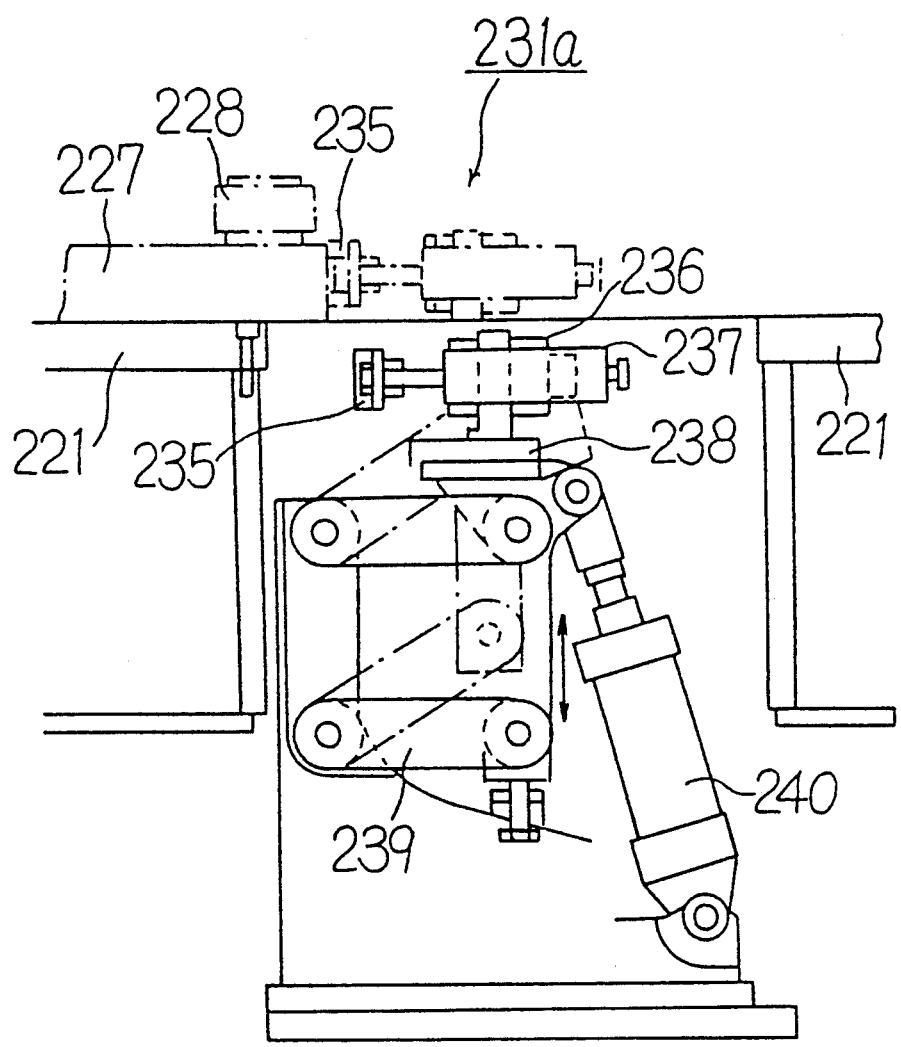
FIG. 17 is a side view of a pallet stopper arranged in the intermediate section.
Figure 18:
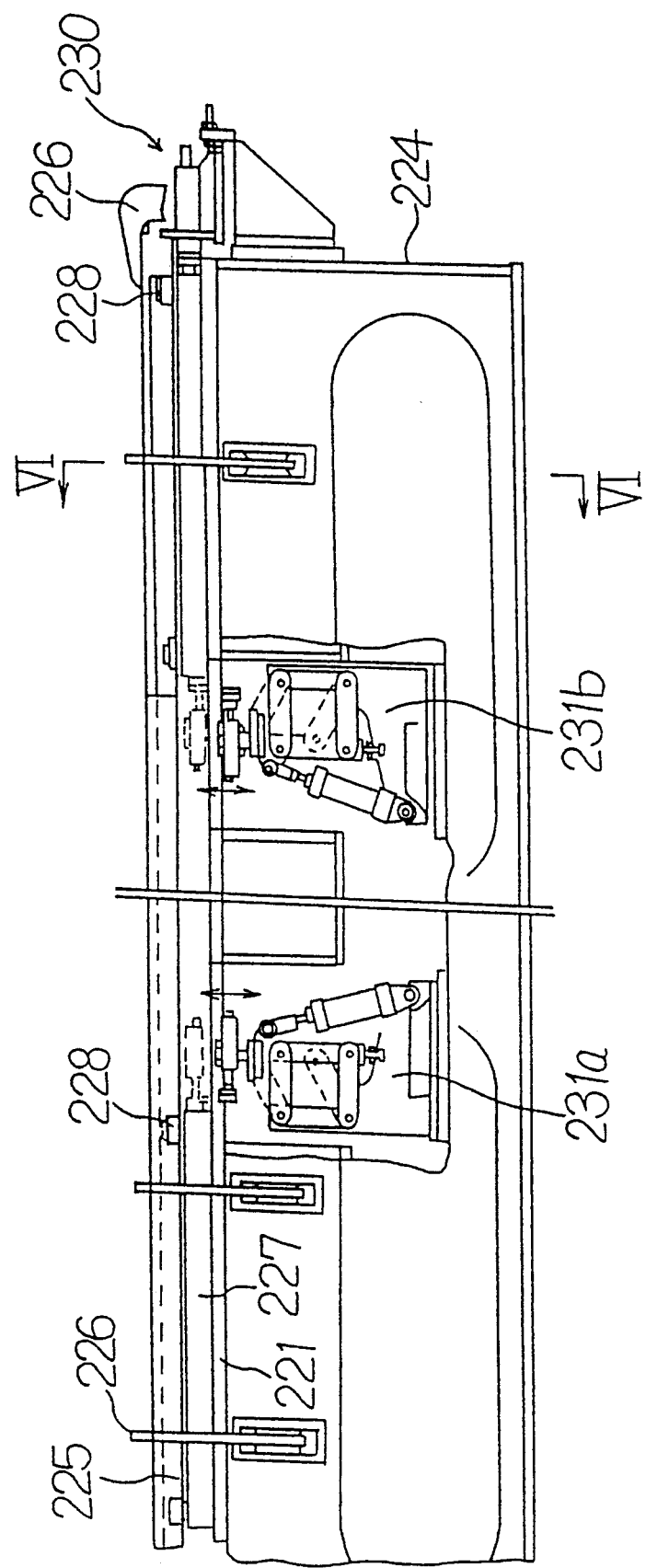
FIG. 18 is a side view of a portion of the air table to which the pallet stopper is mounted.
Figure 19:
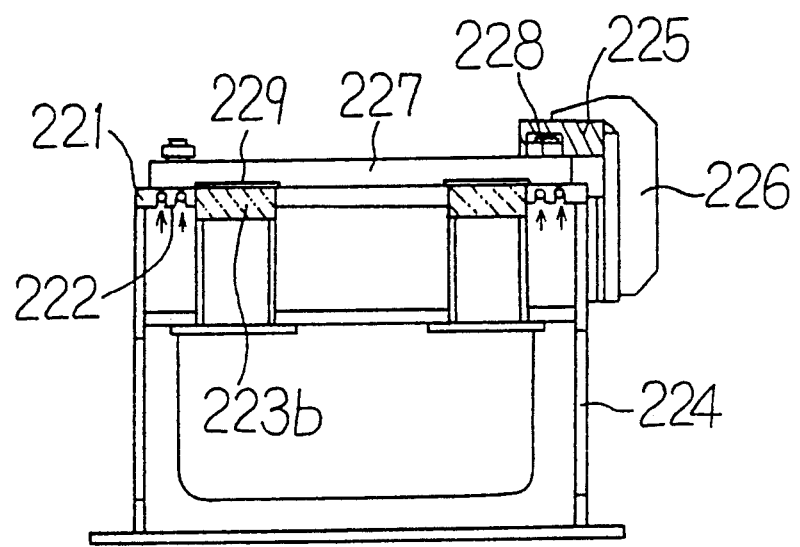
FIG. 19 is a front view, partially in section, of the air table.

A transfer system according to a third embodiment of the present invention will now be described with reference to FIGS. 14 to 19. Reference numeral 221 designates a rectangular frame or air table. Reference numerals 222 designate pressurized air ball valves assembled in the air table 221. In FIGS. 16, 18 and 19, the air table 221 is mounted on a base 221. In FIG. 13, (a) denotes turning sections located at each corner of the air table 221 in a face-to-face relation to the pallet as conveyed and identical in structure to those employed in the first and second embodiments. In FIG. 14, reference numerals 223 designate acceleration linear motor primary coils, and 223b deceleration linear motor primary coils. Each pair of acceleration primary coils 223a is mounted to the air table 221 with the coils being in a spaced relation to one another. A Pair of deceleration primary coils 125b is mounted to each 90° turning section of the air table 124 with the coils thereof being in a spaced relation to one another. In each turning section, the longitudinal axis of each acceleration primary coil 223a extends at right angles to the longitudinal axis of each deceleration primary coil 223b. In FIGS. 18 and 19, a grooved guide 225 is provided above the outer peripheral edge of the air table 221. Reference numeral 226 designates a mounting plate by which the grooved guide 225 is secured to the base 224. Reference numeral 227 designates a transfer pallet. A linear motor secondary conductor 229 is mounted to the lower surface of the pallet 227. Four guide rollers 228 are mounted on the corners of the pallet 227, respectively, and are adapted to rotate within the grooved guide 225.

Figure 15:
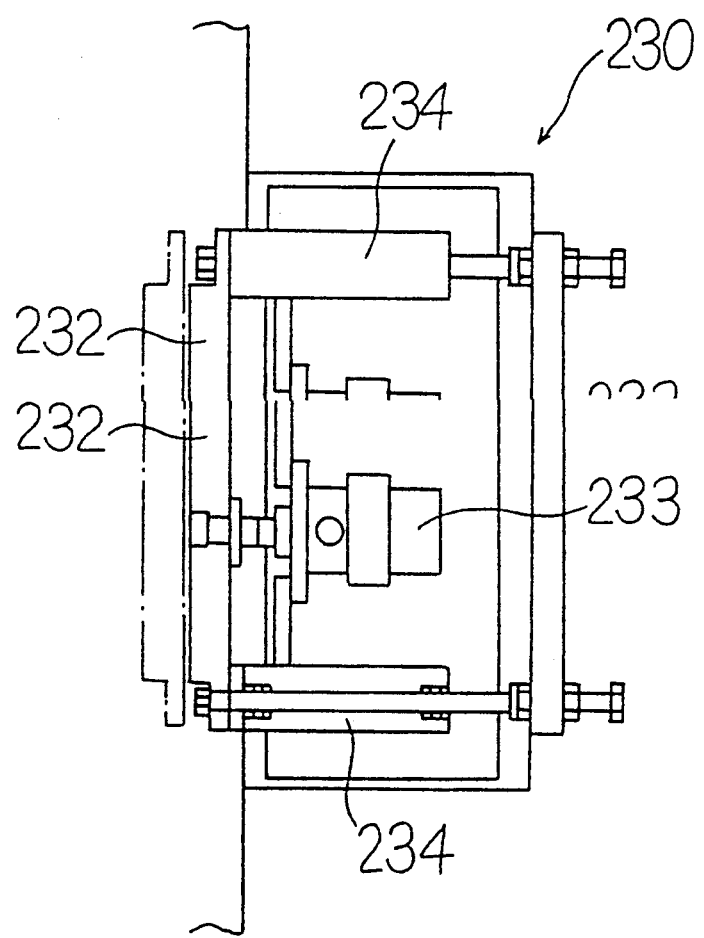
FIG. 15 is a plan view of a pallet stopper mounted to the 90 ° turning section.
Figure 16:
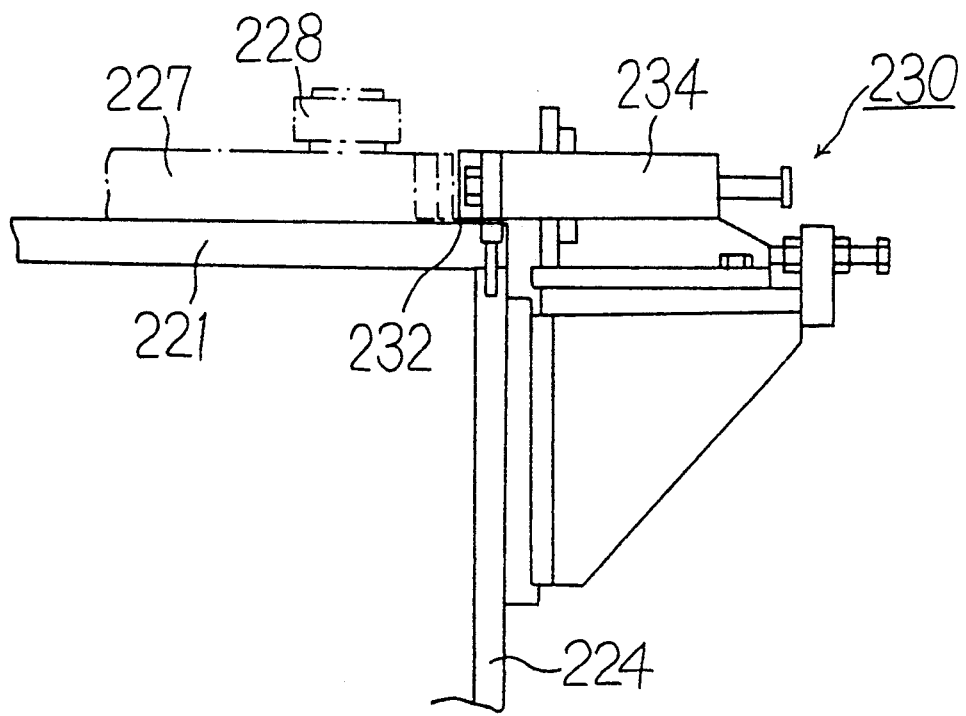
FIG. 16 is a side view of the pallet stopper shown in FIG. 15.

In FIGS. 14 to 16 and 18, reference numerals 230 designate pallet stoppers. As shown in FIGS. 15 and 16, each pallet stopper 230 comprises a stopper plate 232, a pair of guides 234 adapted to support a corresponding pair of retractable guide rods integral with the stopper plate 232, and a shock absorber 233 disposed between the guides 234 and the stopper plate 232. Each pallet stopper 230 is attached to the outer section (a) of the air table 231.

Pallet stoppers 231a and 231b are located at the intermediate sections, rather than the turning sections, of the air table. As shown in FIG. 17, the pallet stopper 231a (231b) comprises a retractable stopper plate 235, a guide 237 adapted to support the stopper plate 235, a shock absorber 236 disposed between the stopper plate 235 and the guide 237, a support table 238 on which the guide 237 is supported, a link mechanism 239 by which the support table 238 is vertically movable relative to the base 224, and a drive cylinder 240 mounted between the link mechanism 239 and the base 224. The pallet stopper 231a is located at the intermediate sections, rather than the 90° turning sections, of the air table 224.

The operation of the transfer system according to the third embodiment of the present invention will now be described with reference to FIGS. 14 and 19. The pallet 227 is first placed on the air table 221, and a load is mounted on the pallet 227. The ball of the ball valve 222 is pushed down against the action of the spring. Air under pressure is applied to the pallet 227 to float the pallet 227 together with the load.

The acceleration primary coils 223a are operable to accelerate the pallet 227. The pallet 227 is moved in the direction of the arrow X shown in FIG. 14. At this time, the guide rollers 228 are rotated within the grooved guide 225 to guide the pallet 227 toward the station A, for example. Immediately before the pallet 227 reaches the intermediate section of the air table, the drive cylinder 240 is operable to lift the support table 238, the guides 237 and the shock absorber 236 and the stopper plate 235 through the link mechanism 239. This causes the stopper plate 235 to contact the pallet 227. The resulting shock is absorbed by the shock absorber 236 so that the pallet 227 may be stopped in the intermediate section of the air table without any shocks.

After the pallet 227 is stopped, the drive cylinder 240 of the pallet stopper 231b is rendered operative to lift up the support table 238, the guides 237, the shock absorber 236 and the stopper plate 235 through the link mechanism 239. This causes the stopper plate 235 be positioned at the rear of the pallet 227.

When the processing of the load in the intermediate section is completed, the drive cylinders 240 of the pallet stoppers 231a and 231b are rendered operative to lower the stopper plates 235, 235. The pallet together with the load is then moved toward the next station or 90° turning section of the air table in a manner as will hereinafter be described.

When the pallet 227 together with the load reaches the 90° turning section of the air table 221, the deceleration primary coils 225b are energized to reduce the speed of the pallet 227. The pallet 227 is stopped when it contacts the pallet stopper 230. Thereafter, the pallet 227 together with the load is moved toward the next station.

The pallets of the first to third embodiments may be used in a press process in which glass products such as a cathode-ray tubes or funnels are made, or in a transfer process of pressed products. Also, the pallets may be used to transfer other loads in a press or transfer process. It is not essential that the pallet be square. The pallet may be rectangular, hexagonal or polygonal. The direction of conveyance of the pallet may be changed by 120° when a hexagonal pallet is employed.

In the first to third embodiments thus described, the direction of conveyance of the pallet is changed by 90°, but may be changed by any degrees. Each turning section of the air table may be in the form of T or cross or may have a plurality of branches. In the latter case, it is preferable that a retractable stopper is provided at each turning section.

Figure 20:
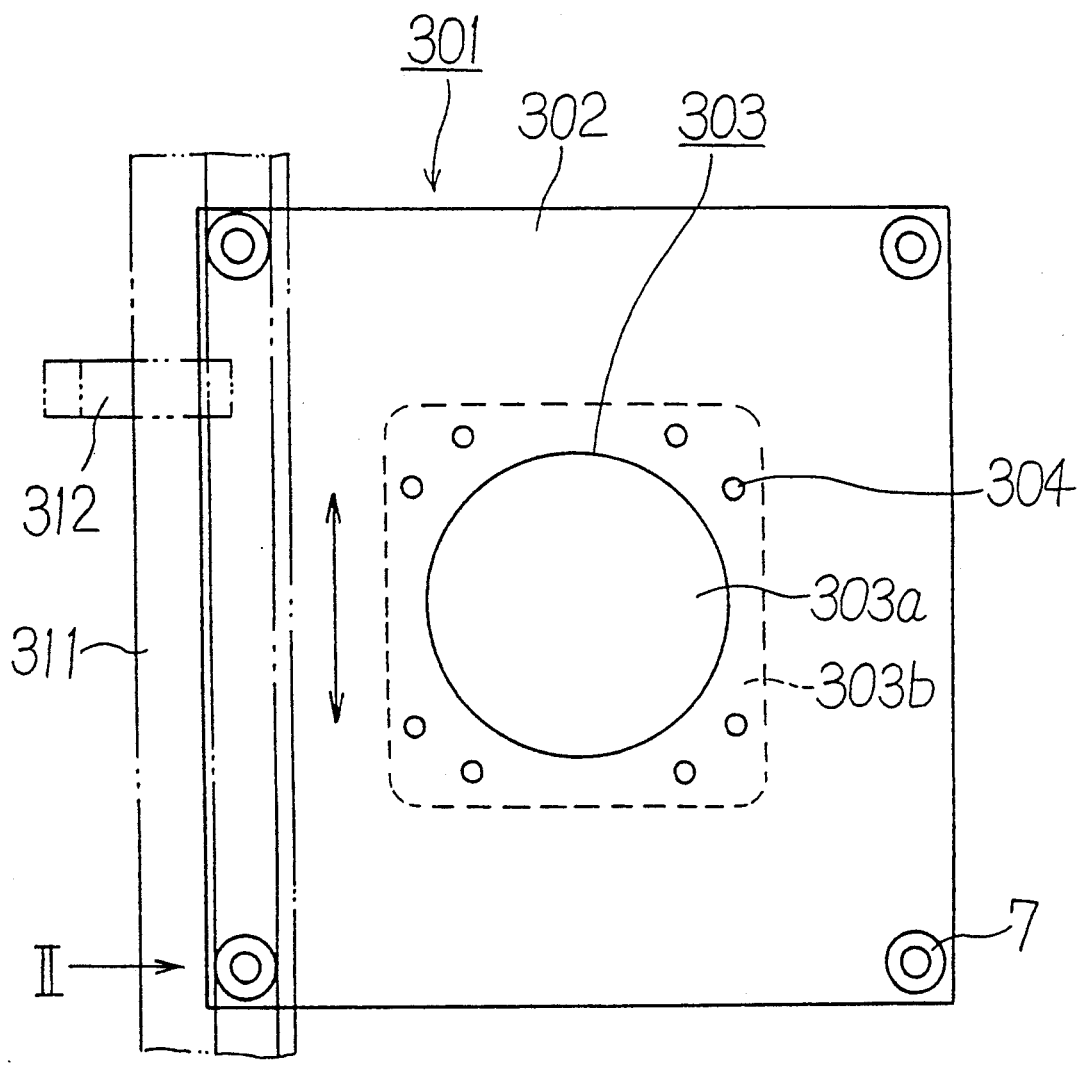
FIG. 20 is a plan view of a pallet according to the present invention.
Figure 21:
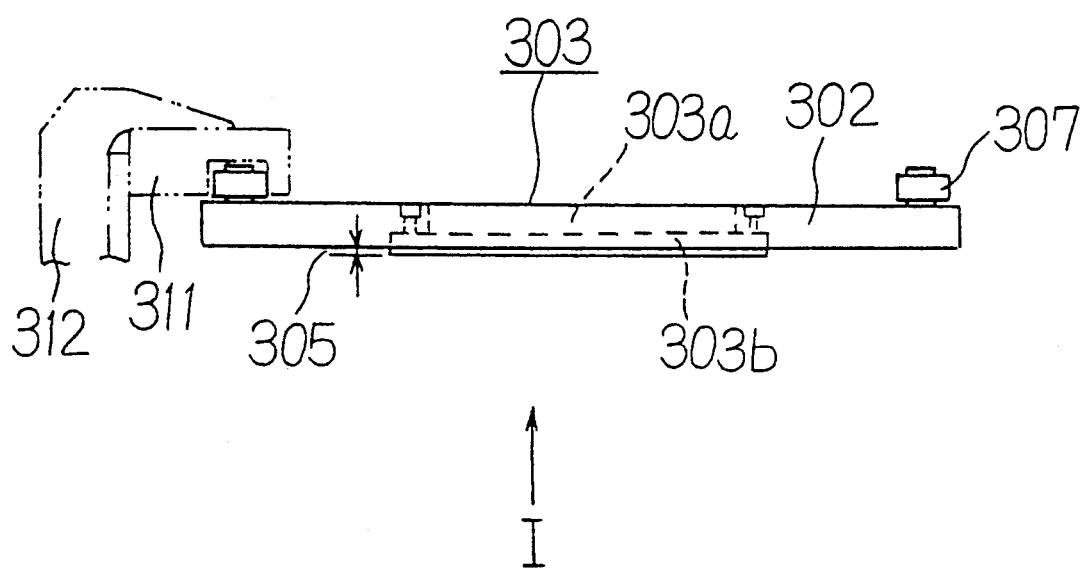
FIG. 21 is a side view of the pallet.
Figure 22:
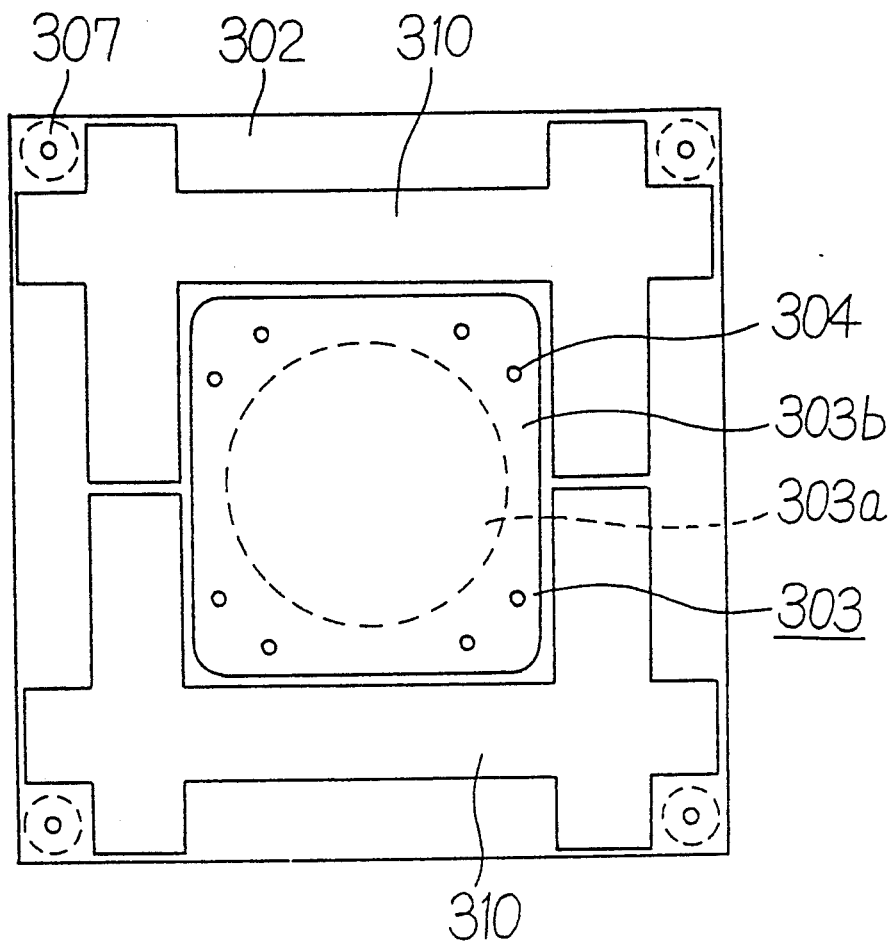
FIG. 22 is a bottom plan view as seen in the direction of the arrow I in FIG. 21.
Figure 23:
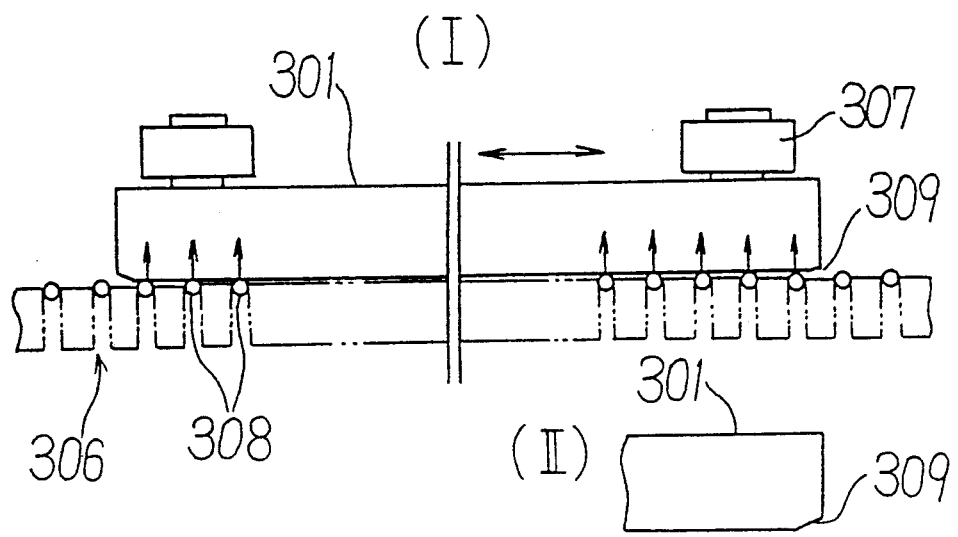
FIG. 23 further illustrates the transfer pallet according to of the present invention, FIG. 23(I) being a side view as seen in the direction of the arrow II in FIG. 20, and FIG. 23(II) being an enlarged side view showing a beveled portion of the pallet body.

A transfer system according to a fourth embodiment of the present invention will now be described with reference to FIGS. 20 to 24. Reference numeral 301 designates a transfer pallet, and 302 a pallet body. The pallet body 302 has a rigid lower surface. The pallet body 302 is light and is made, for example, of aluminum. Reference numeral 303 designates an external load bearing part of the pallet body. The external load bearing part 303 has an upper circular loading section 303a and a lower contact section. The external load bearing part 303 is made of metal such as iron so that it may not be deformed or broken. The circular loading section 303a of the external load bearing part 303 is received in a circular recess formed in the center of the pallet body 302. The contact section 303b of the external load bearing part 303 is fit in a recess formed in the lower surface of the pallet body 302. The external load bearing part 303 is thus integral with the pallet body 302. Bolts 304 secure the external load bearing load bearing part 303 (contact section 303b) to the pallet body 302. As shown in FIG. 21, the external load bearing part 303 (contact section 303b) projects downwardly from the lower surface of the pallet body 302 by about 1 mm.

Figure 24:
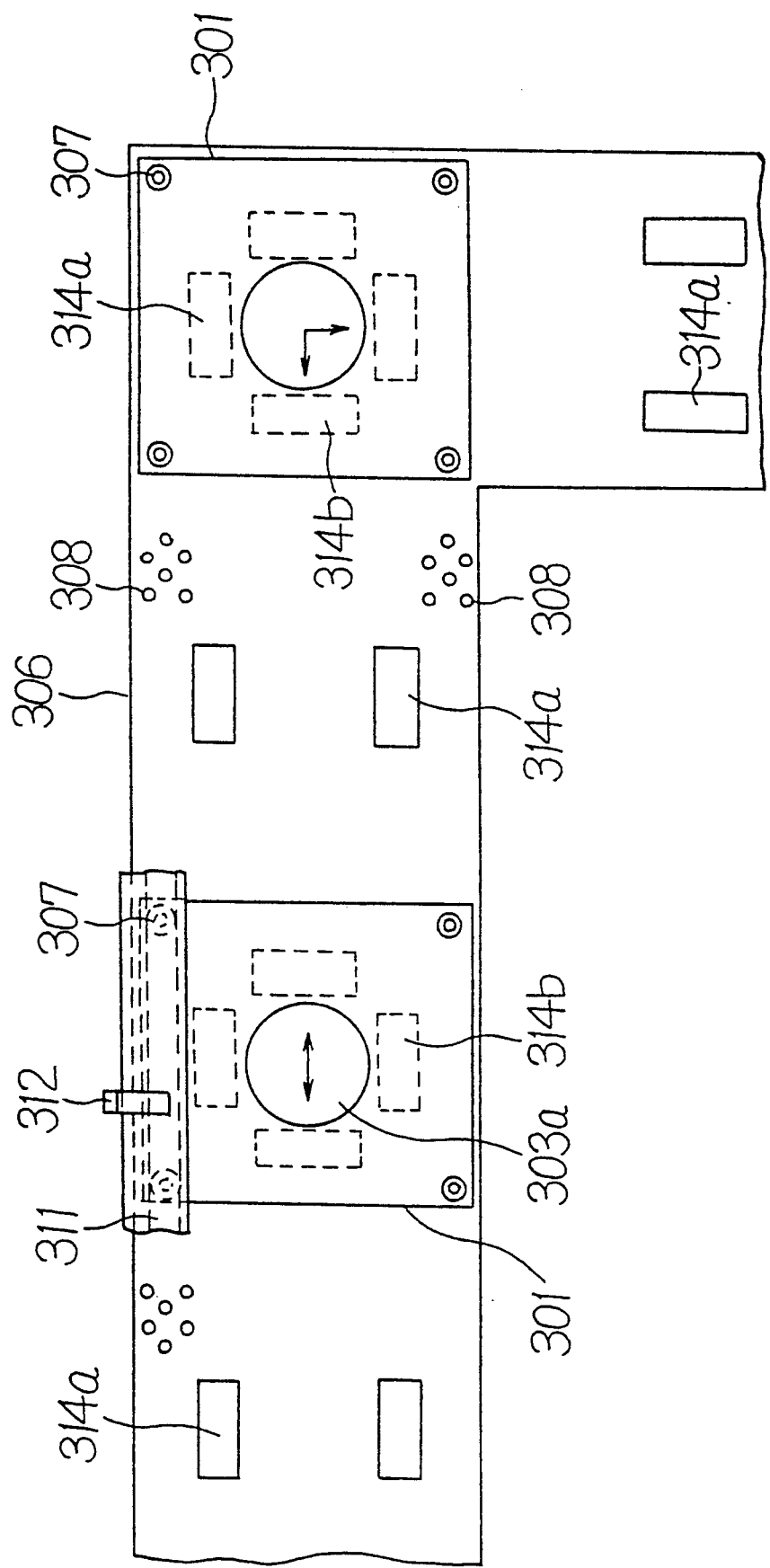
FIG. 24 is a plan view of a transfer system including an air table on which the transfer pallet is moved, and a linear motor by which the transfer pallet is lifted above the air table.

Reference numeral 306 designates an air table. A clearance 305 exists between the pallet body 302 and the air table 306 when the pallet 301 is placed on the air table 306. Guide rollers 307 are mounted on the corners of the pallet body 302, respectively. A number of ball valves 308 are provided in the entire air table 306. The lower corner of the pallet 301 has a bevel 309 for contact with each ball of the ball valve 308 (when the ball is brought into contact with the pallet body 302, it is pushed down to open each air inlet. A secondary linear motor conductor 310 is received in a recess form in the lower surface of the pallet body 302. The secondary conductor 310 is an iron plate welded to the lower surface of the pallet body 302 and has a lower end which does not project from the lower surface of the pallet body 302. A grooved guide 311 is mounted to the air table 306 to receive the guide rollers 307. The grooved guide 311 is mounted to the air table 306 by a mounting plate 312. As shown in FIGS. 20 and 24, it is sufficient to attache the mounting plate 312 to only one side of the air table 306 to guide the pallet. Acceleration primary coils 314a of a linear motor are mounted to the air table 306. Deceleration primary coils 314b are also mounted to the air table 306.

The ball valves 308 and the associated balls are the same as those used in the first to third embodiments. The air table is a rectangular frame as in the first to third embodiments. The acceleration primary coils 314a and the deceleration primary coils 314b are arranged in the same manner as those in the third embodiment. The longitudinal central axis of one station extends at right angles to that of another station adjacent thereto.

The fourth embodiment of the transfer system shown in FIGS. 20 to 24 operates as follows. The pallet 301 is placed on the air table 306, and a load is also placed on the external load bearing part 303 (circular loading section 303a). Air under pressure is then applied through the ball valves 308 to float the pallet 301 together with the load above the air table 306. The acceleration primary coils 314a are energized to accelerate the pallet 301. The guide rollers 307 of the pallet 301 and the grooved guide 311 cooperate to guide the pallet 301. This prevents irregular movement of the pallet 301 until the pallet 301 reaches a station.

At this time, the ball valves 308 are sequentially rendered ON (opened) by the rigid lower surface of the pallet 301 to keep the pallet 301 lifted above the air table. When the pallet body 302 is moved away from the air table, the balls 308 are pushed up by air under pressure and by the spring so as to render the ball valves OFF (or to close the ball valves).

When the pallet reaches a certain station, the deceleration primary coils are operable to reduce the speed of the pallet 301. The pallet 301 is thereafter stopped by stoppers. These stoppers may include the pallet stoppers 28 to 30 of the first embodiment, the pallets stoppers 133 of the second embodiment, and the pallet stoppers 230, 231a, and 231b the third embodiment.

When the pallet 301 is thus stopped, the ball valve 308, located immediately below the pallet 301, is closed by means not shown. The external load bearing part 303 made of iron (contact section 303b) is placed on the air table 306. Since the lower surface of the external load bearing part (contact section 303b) projects slightly from the lower surface of the pallet body 302, the pallet body 302 made of a light material in no way contacts the air table 306. The external load bearing part (contact section 303b) is in contact with the air table 306. By this arrangement, no external force (for example, pressing force) is applied to the pallet body 302.

Figure 25:
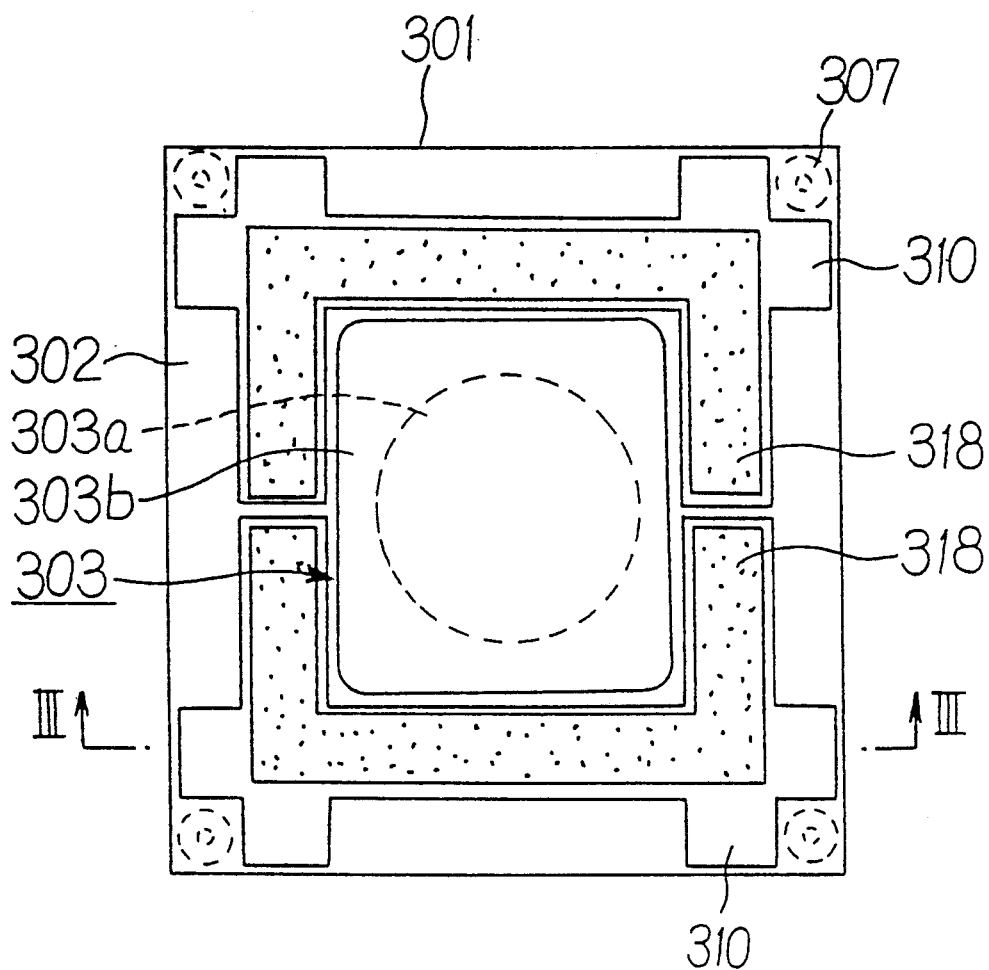
FIG. 25 is a bottom plan view of another embodiment of a pallet according to the present invention.
Figure 26:
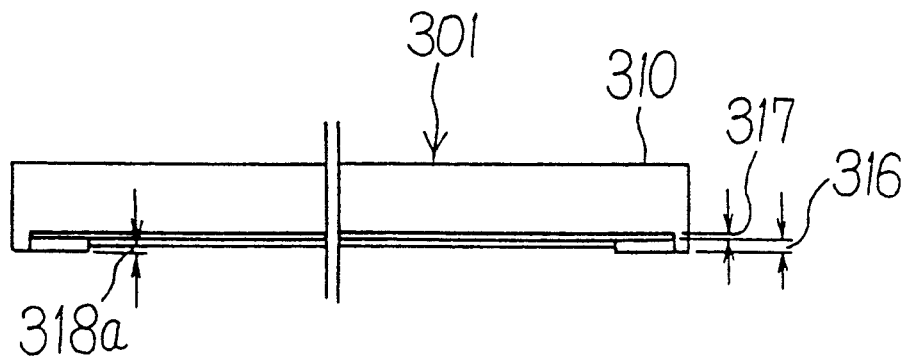
FIG. 26 is a sectional view taken along line III—III of FIG. 25.
Figure 27:
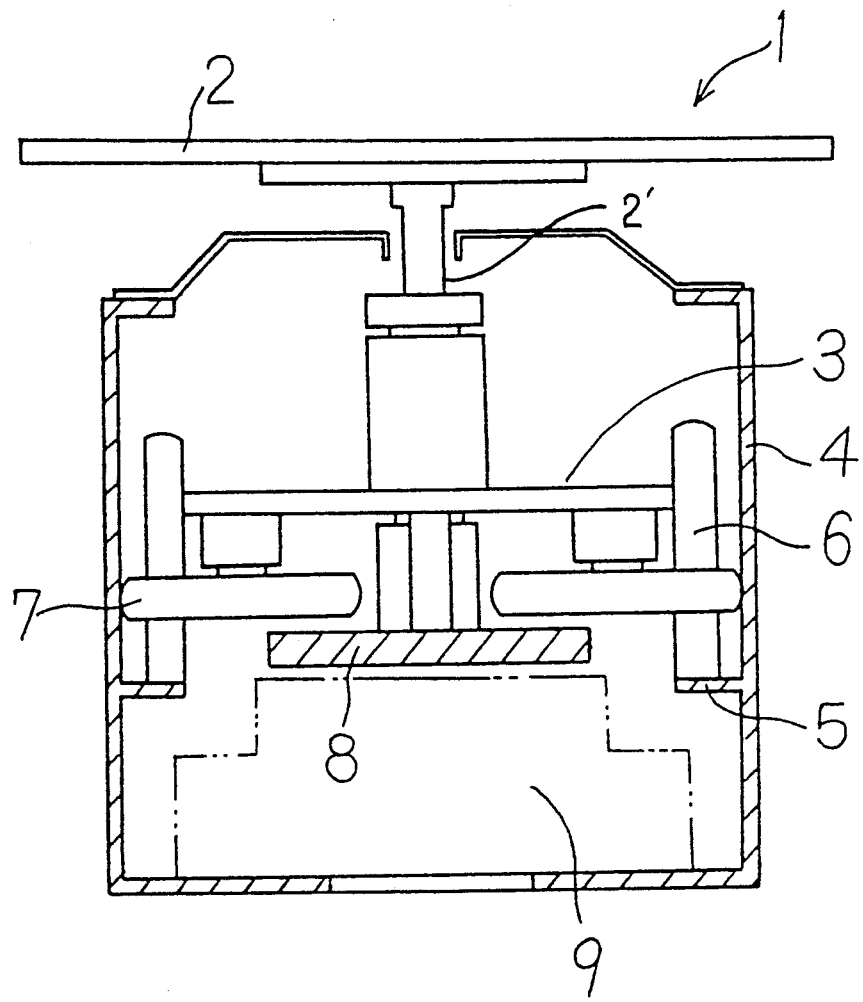
FIG. 27 is a front view, partially in section, of a conventional transfer system.
Figure 28:
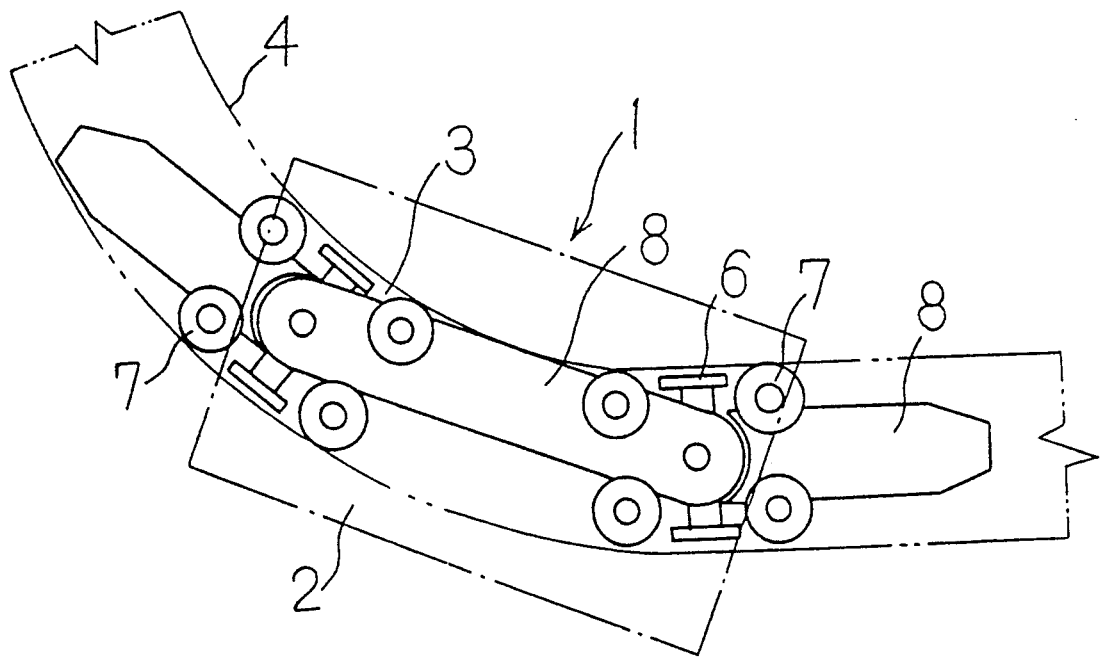
FIG. 28 is a plan view of a turning section in the conventional system by which the direction of conveyance of a pallet is changed.
Figure 29:
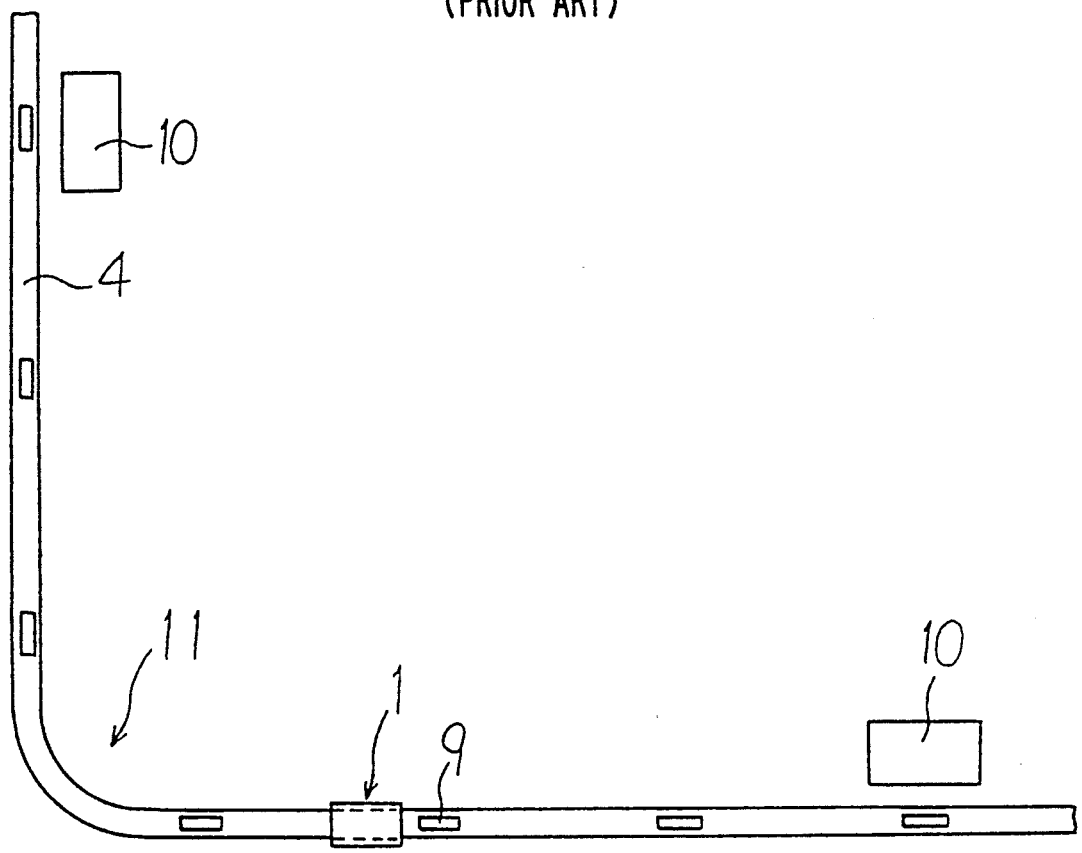
FIG. 29 is a plan view of the transfer system shown in FIG. 27.
Figure 30:
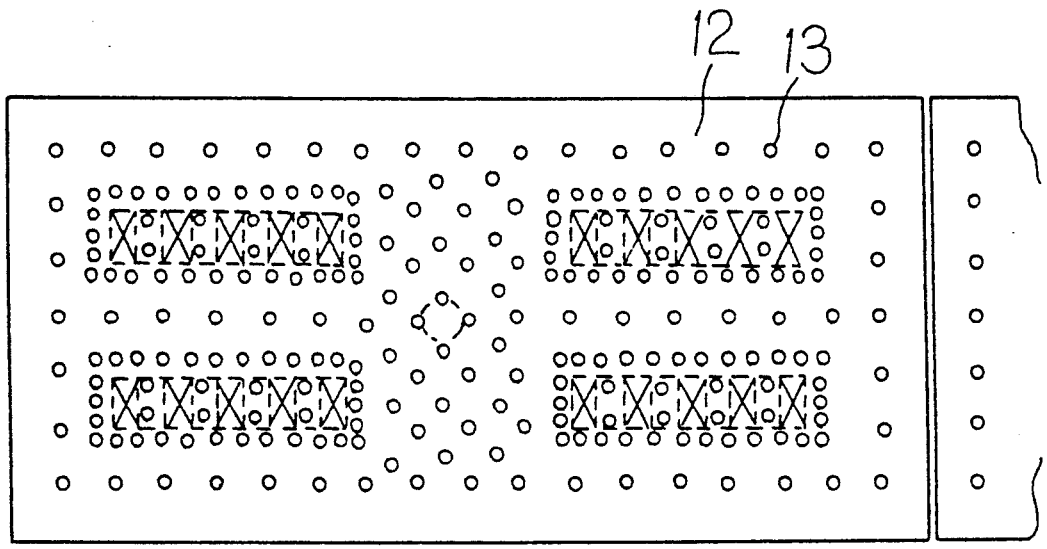
FIG. 30 is a plan view of another transfer system known in the art.
Figure 31:
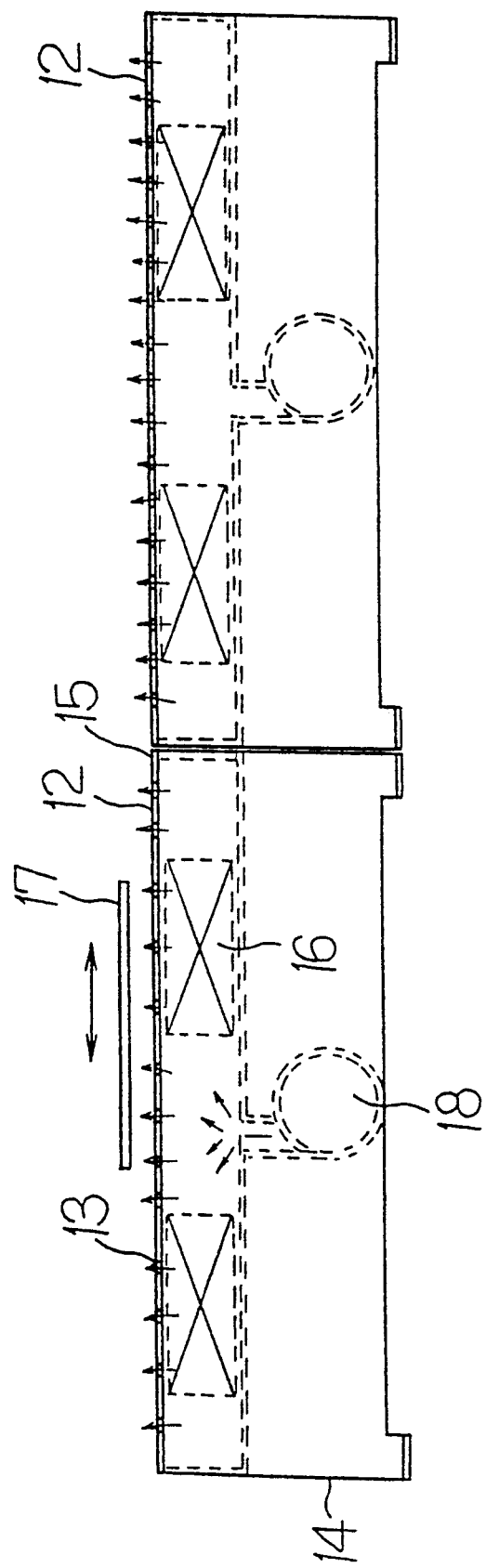
FIG. 31 is a side view of a conventional transfer system.

FIGS. 25 and 26 illustrate a fifth embodiment of the present invention wherein a secondary conductor 310 includes an aluminum plate 316 and a steel plate 317 attached to the aluminum plate 316 and is fit in the recess formed in the lower surface of the pallet body as in the fourth embodiment. In the secondary conductor or composite material 310, a portion of the aluminum plate 316 which is not engaged with the ball valves 308 is recessed as at 318a to provide an air pocket 318. Air under pressure is applied from the ball valves 308 to the air pocket 318 to more positively float the pallet 301. The operation of the rest of the fifth embodiment is identical to that of the embodiment shown in FIGS. 20 to 24.

The pallets of the fourth and fifth embodiments may be used in a press process in which glass products such as a cathode-ray tubes or funnels are made, or in a transfer process of pressed products. Also, the pallets may be used to transfer other loads in a press or transfer process. It is not essential that the pallets be square. The pallets may be rectangular, hexagonal or polygonal. The direction of conveyance of the pallet may be changed by 120° when a hexagonal pallet is employed.

In the fourth and fifth embodiments thus described, the direction of conveyance of the pallet is changed by 90°, but may be changed by any degrees. Each turning section of the air table may be in the form of T or cross or may have a plurality of branches. In the latter case, it is preferable that a retractable stopper is provided at each turning section.

Advantages of the present invention are as follows.

The pallet is placed on the air table, and a load is placed on the pallet. The ball valve, located immediately below the pallet, is opened to apply air under pressure to float the pallet. The primary coil of the linear motor is then energized to accelerate the pallet. The pallet is moved toward a station while the guide of the pallet is engaged with the guides of the air table. When the pallet reaches the station, the primary coil of the linear motor is energized to reduced the speed of the pallet, and the pallet stoppers are operable to stop the pallet. The pallet is thereafter moved to a next station. Thus, the pallet together with the load can be moved exactly on and along the air table.

This arrangement eliminates the need for a turning section of an increased radius of curvature. Also, the overall transfer system can be well organized or arranged.

Only the ball valve which is located immediately below the pallet is opened. This allows the use of a smaller source of pressurized air supply so as to reduce the equipment cost of the system. Also, it enables a reduction in the consumption of air under pressure and thus, the running cost of the transfer system.

When the pallet together with a load reaches the turning station of the air table, the deceleration primary coil of the linear motor is energized to reduce the speed of the pallet. The pallet is stopped when it comes into contact with the pallet stoppers. At this time, the guide roller at the inner front of the pallet is moved into the grooved guide through the recess.

Next, the acceleration primary coil of the linear motor is energized to accelerate the pallet. The pallet is moved to the turning section of the air table. At this time, the guide roller at the inner rear side of the pallet is moved out of the grooved guide through the recess. When the pallet reaches the next turning station, the direction of conveyance of the pallet is changed in a similar manner.

Thus, the pallet can be smoothly transferred. The pallet can be smoothly stopped in each turning station. Also, the direction of conveyance of the pallet can be smoothly changed.

In each turning section of the air table, the pallet stopper mounted to the outer turning section in a face-to-face relation to the pallet as conveyed is operated to stop the pallet. The pallet is then moved in an intended different direction. This arrangement eliminates the need for a turning section having a large radius of curvature and contributes to the overall flexibility of the transfer system. Also, the pallet together with a load can accurately be stopped in a predetermined position. This improves the operability as well as safety in a production line.

The transfer pallet comprises a pallet body made from a light material, and an external load part made of metal. Thus, the overall weight of the pallet can be small and thus the pallet can be conveyed by a small linear motor and under a small flow rate of air under pressure. Thus, a compact transfer system wherein the air table and the linear motor cooperate to float and transfer the pallet can be realized.

The lower surface of the external load part projects slightly downwardly from the lower surface of the pallet body. This allows the external load part to receive any external forces. Thus, no external force is exerted on the pallet body. The pallet thus has a high strength.

What is claimed is:

1. A transfer system comprising: a pallet having rollers rotatably supported thereon, an air table defining an upper surface on which said pallet is supported and air passageways communicating with said upper surface so as to allow air fed therethrough under pressure to cause the pallet to float above said upper surface, a linear motor operatively associated with said pallet so as to drive said pallet along said air table, said air table having intermediate sections and turning sections at which said intermediate sections intersect each other at such an angle that said turning sections define corners of said air table at which the direction in which said pallet is driven by said linear motor changes, said linear motor comprising acceleration primary coils and deceleration primary coils mounted to said turning sections of the air table, said acceleration primary coils being operable to accelerate said pallet and said deceleration primary coils being operable to decelerate said pallet such that the pallet can be decelerated as it arrives at said turning sections and can be accelerated in a direction away from said turning sections, pallet stoppers mounted to said turning sections and disposed at outer sides thereof above the upper surface of said air table so as to face the pallet as the pallet arrives at the turning sections, and guides mounted to the turning sections at such a position as to receive the rollers of said pallet as the pallet arrives at said turning sections to guide the pallet, said guides including recesses through which the rollers of the pallet pass as the direction in which the pallet is driven is changed at said turning sections.

2. A transfer system as claimed in claim 1, wherein said primary accelerating and primary decelerating coils mounted to a respective said turning section of the air table have longitudinal axes oriented relative to one another at the angle at which the intermediate sections of the air table intersect each other at said respective turning section.

3. A transfer system as claimed in claim 2 wherein the intermediate sections of said air table intersect each other at an angle of 90° at said respective turning section and the longitudinal axes of said primary accelerating and primary decelerating coils mounted to said respective turning section are oriented at an angle of 90° relative to one another.

4. A transfer system comprising: a pallet having a guide at the outer periphery thereof, an air table defining an upper surface on which said pallet is supported and air passageways communicating with said upper surface so as to allow air fed therethrough under pressure to cause the pallet to float above said upper surface, a linear motor operatively associated with said pallet so as to drive said pallet along said air table, said air table having intermediate sections and turning sections at which said intermediate sections intersect each other at such an angle that said turning sections define corners of said air table at which the direction in which said pallet is driven by said linear motor changes, guides mounted to the air table and engaging the guide of said pallet so that said pallet is positively guided along said table when driven by said linear motor, pallet stoppers mounted to said turning sections of the air table and disposed at outer sides thereof above the upper surface of said air table so as to face the pallet as the pallet arrives at said turning sections, and pallet stoppers mounted to said intermediate sections of the air table, said pallet stoppers mounted to the intermediate sections of the air table being extendable above and retractable below the upper surface of said air table.

5. A transfer system as claimed in claim 4, and further comprising ball valves disposed in said air table, each of said ball valves having an air passageway terminating at the upper surface of said air table, a valve seat extending around said passageway at the upper surface of said air table, and a ball biased toward said valve seat, said ball valves normally being in closed positions in which the balls therein are seated on the respective valve seats and protrude from the air passageways above the upper surface of said air table, the valves being opened upon contact of the pallet with the balls so as to open said air passageways to the upper surface of said air table and allow air under pressure fed to said passageways to force the pallet to float above said upper surface.

6. A transfer system as claimed in claim 4, wherein said pallet stoppers mounted to said turning sections of the air table each comprise a stopper plate, guide rods integral with the stopper plate, guides supporting said guide rods in a manner which allows the guide rods to extend and retract, and a shock absorber connected to said stopper plate.

7. A transfer system as claimed in claim 6, and further comprising second pallet stoppers mounted to said turning sections at sides thereof opposite said outer sides.

8. A transfer system as claimed in claim 7, wherein said second pallet stoppers comprise a stopper arm, and a motor operatively connected to said stopper arm so as to drive said stopper arm between positions at which said stopper arm is disposed above and below the upper surface of said air table, respectively.

9. A transfer system as claimed in claim 4, and further comprising second pallet stoppers mounted to said turning sections at sides thereof opposite said outer sides.

10. A transfer system as claimed in claim 9, wherein said second pallet stoppers comprise a stopper arm, and a motor operatively connected to said stopper arm so as to drive said stopper arm between positions at which said stopper arm is disposed above and below the upper surface of said air table, respectively.

11. A transfer system as claimed in claim 4, wherein said pallet stoppers mounted to the intermediate sections of said air table each comprise a stopper plate, a guide supporting said stopper plate in a manner which allows said stopper plate to extend and retract relative to the guide, a shock absorber connected to said stopper plate, a support table on which the stopper plate, the guide supporting the stopper plate and the shock absorber are supported, a linkage supporting said support table and articulatable between positions at which the stopper plate is disposed above and below the upper surface of said air table, respectively, and a drive cylinder operatively connected to said linkage so as to drive said linkage between the positions thereof.

* * * * *